United States Patent
Asukabe et al.

(10) Patent No.: US 10,917,555 B2
(45) Date of Patent: Feb. 9, 2021

(54) IMAGING APPARATUS, FOCUS CONTROL METHOD, AND FOCUS DETERMINATION METHOD

(71) Applicant: SONY CORPORATION, Tokyo (JP)

(72) Inventors: Yuki Asukabe, Saitama (JP); Tomoyuki Minami, Tokyo (JP)

(73) Assignee: SONY CORPORATION, Tokyo (JP)

(*) Notice: Subject to any disclaimer, the term of this patent is extended or adjusted under 35 U.S.C. 154(b) by 0 days.

(21) Appl. No.: 16/493,632

(22) PCT Filed: Feb. 7, 2018

(86) PCT No.: PCT/JP2018/004156
§ 371 (c)(1),
(2) Date: Sep. 12, 2019

(87) PCT Pub. No.: WO2018/179875
PCT Pub. Date: Oct. 4, 2018

(65) Prior Publication Data
US 2020/0077030 A1  Mar. 5, 2020

(30) Foreign Application Priority Data

Mar. 30, 2017 (JP) .................. 2017-067391

(51) Int. Cl.
*H04N 5/232* (2006.01)
*G02B 7/34* (2021.01)
*H04N 5/238* (2006.01)

(52) U.S. Cl.
CPC ......... *H04N 5/232122* (2018.08); *G02B 7/34* (2013.01); *H04N 5/238* (2013.01)

(58) Field of Classification Search
None
See application file for complete search history.

(56) References Cited

U.S. PATENT DOCUMENTS

| 4,988,856 | A | * | 1/1991 | Hamada | ................... | G02B 7/36 |
| | | | | | | 250/201.8 |
| 2005/0031330 | A1 | * | 2/2005 | Nonaka | .................. | G03B 13/36 |
| | | | | | | 396/104 |

(Continued)

FOREIGN PATENT DOCUMENTS

| CN | 106060376 A | 10/2016 |
| JP | 2008-134389 A | 6/2008 |

(Continued)

OTHER PUBLICATIONS

International Search Report and Written Opinion of PCT Application No. PCT/JP2018/004156, dated May 15, 2018, 07 pages of ISRWO.

(Continued)

*Primary Examiner* — James M Hannett
(74) *Attorney, Agent, or Firm* — Chip Law Group

(57) ABSTRACT

An imaging unit is configured with use of an imaging element including an image output pixel and a phase difference detection pixel. A control unit performs focus control based on image-plane phase difference information obtained using the phase difference detection pixel over a predetermined period, generates focus state change information indicating whether or not a change in a focus state is a monotonous change, and continues the focus control based on the image-plane phase difference information on the assumption of a large blur state in a case where the focus state change information indicates that a change in the focus state is a monotonous change. The control unit switches from the image-plane phase difference auto-focus operation to an auto-focus operation in a case where a change in the focus state is not a monotonous change. Thus, it becomes possible to perform a high-speed and high-quality auto-focus operation.

20 Claims, 15 Drawing Sheets

(56) References Cited

U.S. PATENT DOCUMENTS

| | | | |
|---|---|---|---|
| 2008/0259202 A1 | 10/2008 | Fujii | |
| 2010/0150538 A1 | 6/2010 | Ono et al. | |
| 2014/0184853 A1* | 7/2014 | Ogawa | G06T 7/571 348/239 |
| 2014/0300792 A1* | 10/2014 | Nakamura | H04N 5/23212 348/333.08 |
| 2015/0022712 A1* | 1/2015 | Koishi | G03B 13/36 348/352 |
| 2015/0124157 A1 | 5/2015 | Hongu et al. | |
| 2016/0277668 A1* | 9/2016 | Yokozeki | H04N 5/23212 |
| 2016/0295103 A1 | 10/2016 | Ishii | |

FOREIGN PATENT DOCUMENTS

| | | |
|---|---|---|
| JP | 2014-203049 A | 10/2014 |
| JP | 2016-197231 A | 11/2016 |
| JP | 6614783 B2 | 12/2019 |

OTHER PUBLICATIONS

Extended European Search Report of EP Application No. 18774938.7, dated Feb. 27, 2020, 12 pages.

* cited by examiner

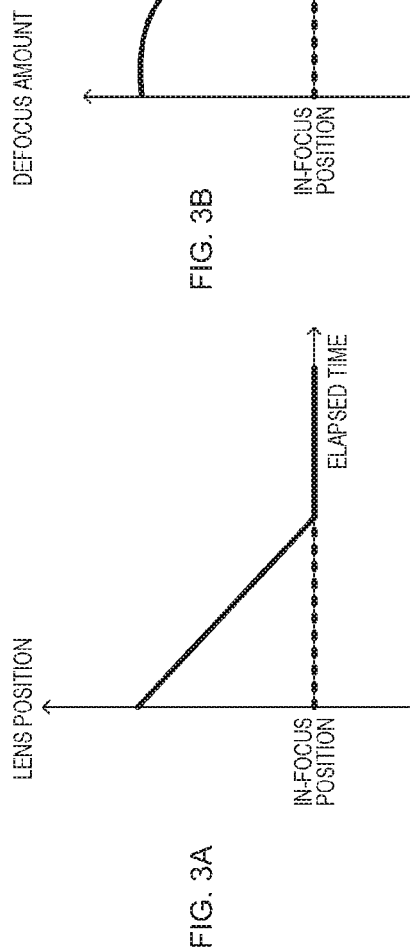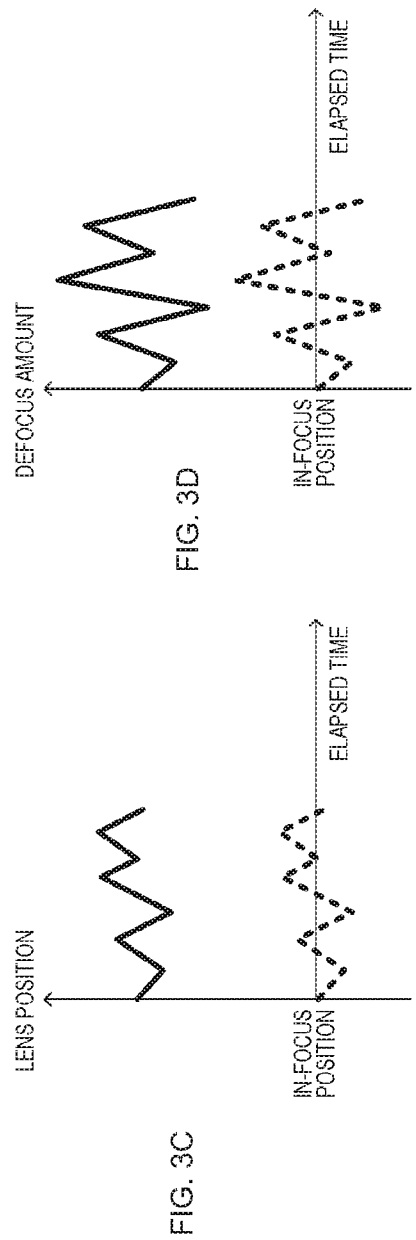

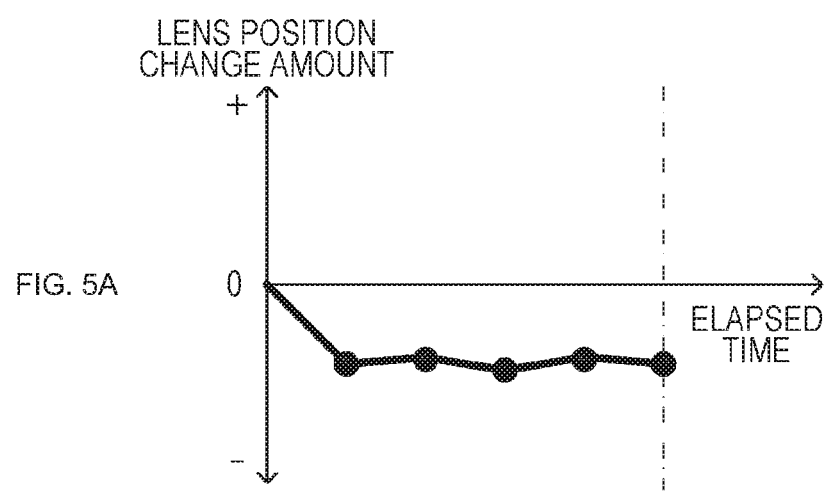
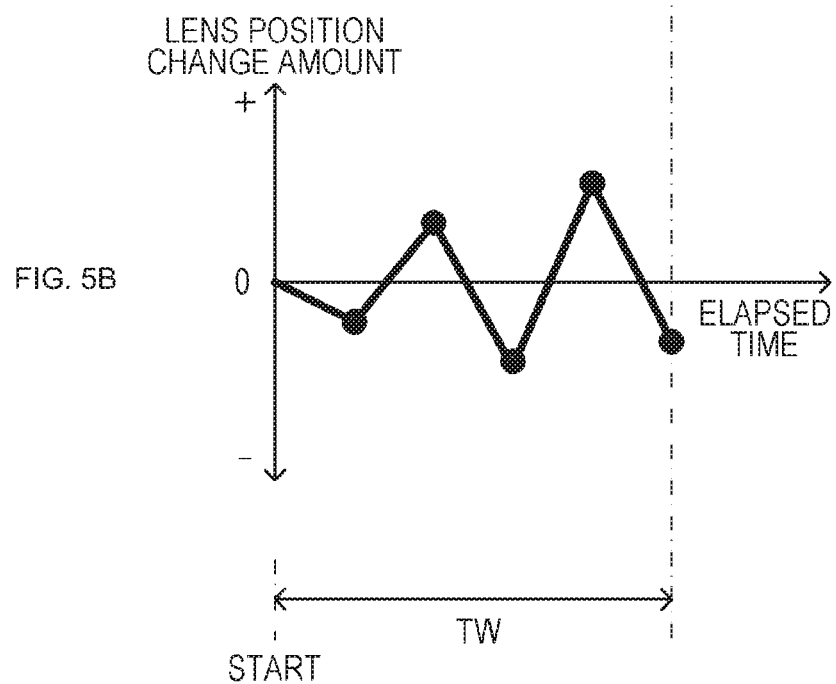

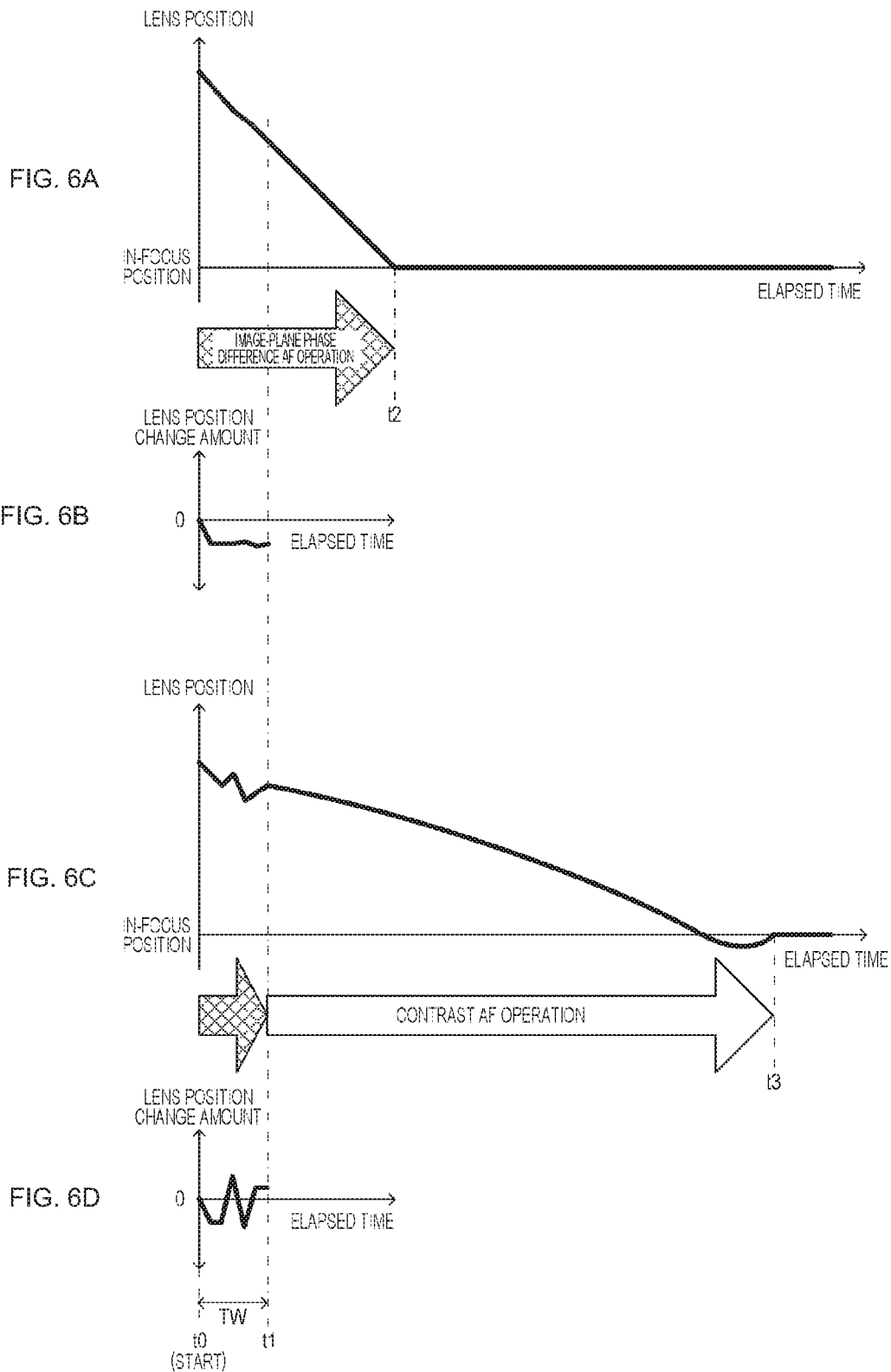

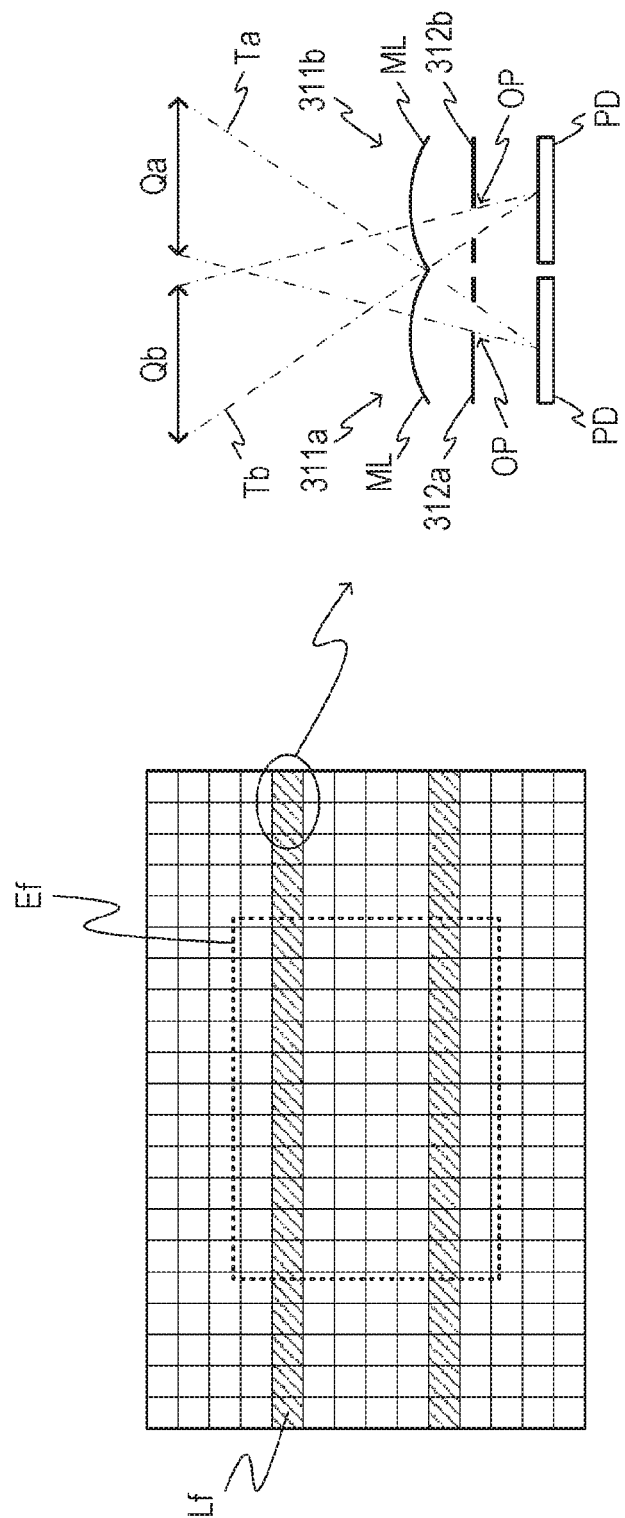

IMAGING APPARATUS, FOCUS CONTROL METHOD, AND FOCUS DETERMINATION METHOD

CROSS REFERENCE TO RELATED APPLICATIONS

This application is a U.S. National Phase of International Patent Application No. PCT/JP2018/004156 filed on Feb. 7, 2018, which claims priority benefit of Japanese Patent Application No. JP 2017-067391 filed in the Japan Patent Office on Mar. 30, 2017. Each of the above-referenced applications is hereby incorporated herein by reference in its entirety.

TECHNICAL FIELD

The present technology relates to an imaging apparatus, a focus control method, and a focus determination method, and enables a high-speed and high-quality auto-focus operation.

BACKGROUND ART

Conventionally, in an imaging apparatus, as a focus control method, focus control of a contrast detection method has been performed of calculating a contrast evaluation value on the basis of an imaging signal generated by an imaging element while moving a focus lens, and searching for a focus lens position at which the contrast evaluation value becomes maximum. Furthermore, in the focus control method, focus control of an image-plane phase difference method has been performed in which a defocus amount is calculated on the basis of a phase shift of two phase-difference images obtained by receiving, with a phase difference detection pixel provided on an imaging surface, a luminous flux that has passed through mutually different exit pupil regions in an imaging optical system, and a focus lens is moved by a movement amount corresponding to the defocus amount. Moreover, Patent Document 1 discloses performing not only focus control of an image-plane phase difference method but also focus control of a contrast method, by using an imaging element having a pixel for detecting a phase difference.

CITATION LIST

Patent Document

Patent Document 1: Japanese Patent Application Laid-Open No. 2008-134389

SUMMARY OF THE INVENTION

Problems to be Solved by the Invention

Meanwhile, in the focus control of the image-plane phase difference method, for example, when the focus is largely shifted in a case where an imaging lens with a long focal length is used, an image on an imaging surface is also largely blurred. Therefore, an information amount of phase difference information is small, and it becomes difficult to correctly calculate a defocus amount. In such a case, a desired subject can be focused by switching the control method to a contrast detection method. However, in the contrast detection method, an evaluation value is calculated by moving a focus lens, and an in-focus direction and an in-focus position are detected on the basis of the calculated evaluation value. Therefore, when a frequency of switching to the contrast detection method becomes high, a case of taking time to achieve an in-focus state is increased, and the quality also decreases.

Therefore, it is an object of the present technology to provide an imaging apparatus, a focus control method, and a focus determination method that enable a high-speed and high-quality auto-focus operation.

Solutions to Problems

A first aspect of the present technology is in an imaging apparatus including:

an imaging element including an image output pixel and a phase difference detection pixel; and a control unit that generates focus state change information indicating whether or not a change in a focus state is a monotonous change, on the basis of focus state information obtained during execution of focus control based on image-plane phase difference information obtained using the phase difference detection pixel over a predetermined period, and continues image-plane phase difference focus control based on the image-plane phase difference information in a case where the focus state change information indicates that a change in the focus state is a monotonous change.

In the present technology, imaging is performed using the imaging element including the image output pixel and the phase difference detection pixel. The control unit performs focus control based on the image-plane phase difference information obtained using the phase difference detection pixel over a predetermined period, and generates the focus state change information indicating whether or not a change in a focus state is a monotonous change.

The control unit determines whether or not a change in the focus state is a monotonous change, for example, on the basis of a change amount in an actual lens position of a focus lens or a change amount in a defocus amount indicated by the image-plane phase difference information, to generate the focus state change information. Furthermore, the control unit may make determination on the basis of a frequency characteristic of a change amount in an actual lens position of the focus lens or a change amount in a defocus amount indicated by the image-plane phase difference information to generate the focus state change information, or may make determination on the basis of an actual lens position of the focus lens or a defocus amount indicated by the image-plane phase difference information to generate the focus state change information.

In a case where the focus state change information indicates that a change in the focus state is a monotonous change, the control unit continues the focus control based on the image-plane phase difference information. Furthermore, in a case where the focus state change information indicates that a change in the focus state is not a monotonous change, the control unit switches from the focus control based on the image-plane phase difference information, to focus control based on information other than the image-plane phase difference information or focus control based on the image-plane phase difference information and information other than the image-plane phase difference information. As the focus control based on information other than the image-plane phase difference information, it is possible to perform focus control based on image information obtained using the image output pixel or distance measurement information obtained by a distance-measurement-information generating element provided separately from the imaging element, and it is also possible to switch between the focus control based on the image information obtained using the image output pixel and the focus control based on information different from the image information.

Furthermore, the control unit performs correlation calculation of two images having parallax obtained from an output of the phase difference detection pixel prior to the predetermined period, determines reliability of a correlation calculation result, generates focus state change information in a case where it is determined that the correlation calculation result is reliable, and performs an entire search operation of moving the focus lens from one end part side to the other end part side to detect an in-focus position in a case where it is determined that the correlation calculation result is not reliable.

A second aspect of the present technology is in an imaging apparatus including:

an imaging element including an image output pixel and an image-plane phase difference detection pixel; and a determination unit that generates focus state change information indicating whether or not a change in a focus state is a monotonous change, on the basis of focus state information obtained during execution of image-plane phase difference focus control based on image-plane phase difference information obtained using the phase difference detection pixel over a predetermined period, determines as a state where a focus position shift of a focus lens is large in a case where the focus state change information indicates that a change in the focus state is a monotonous change, and determines as a state where contrast of a subject imaged by the image output pixel is low in a case where the focus state change information indicates that a change in the focus state is not a monotonous change.

In the present technology, imaging is performed using the imaging element including the image output pixel and the phase difference detection pixel. The determination unit performs focus control based on the image-plane phase difference information obtained using the phase difference detection pixel over a predetermined period, and generates focus state change information indicating whether or not a change in a focus state is a monotonous change. For example, the focus state information is an actual lens position of a focus lens or a defocus amount indicated by the image-plane phase difference information, and the determination unit determines whether or not a change in the focus state is a monotonous change, on the basis of a change amount in the actual lens position or a change amount in the defocus amount. Furthermore, the focus state information is an actual lens position of a focus lens or a defocus amount indicated by the image-plane phase difference information, and the determination unit determines whether or not a change in the focus state is a monotonous change, on the basis of a frequency characteristic of a change amount in an actual lens position of the focus lens or a frequency characteristic of a change amount in a defocus amount. Furthermore, the focus state information is an actual lens position of a focus lens and a defocus amount indicated by the image-plane phase difference information, and the determination unit determines whether or not a change in the focus state is a monotonous change, on the basis of both the actual lens position of the focus lens and the defocus amount.

Furthermore, the determination unit determines reliability of a correlation calculation result of two images having parallax obtained from an output of the image-plane phase difference detection pixel prior to the predetermined period, and the control unit starts generation of focus state change information in a case where it is determined that the correlation calculation result is reliable. Furthermore, the determination unit controls presentation of a state determination result by an information presentation unit that presents a state determination result to a user.

A third aspect of the present technology is in a focus control method including:

generating focus state change information indicating whether or not a change in a focus state is a monotonous change, on the basis of focus state information obtained during execution of image-plane phase difference focus control based on image-plane phase difference information obtained over a predetermined period, by using a phase difference detection pixel of an imaging element including an image output pixel and the phase difference detection pixel; and continuing the image-plane phase difference focus control based on the image-plane phase difference information in a case where the focus state change information indicates that a change in the focus state is a monotonous change.

A fourth aspect of the present technology is a focus control method including:

generating focus state change information indicating whether or not a change in a focus state is a monotonous change, on the basis of focus state information obtained during execution of image-plane phase difference focus control based on image-plane phase difference information obtained over a predetermined period, by using a phase difference detection pixel of an imaging element including an image output pixel and the image-plane phase difference detection pixel; and determining as a state where a focus position shift of a focus lens is large in a case where the focus state change information indicates that a change in the focus state is a monotonous change, and determining as a state where contrast of a subject imaged by the image output pixel is low in a case where the focus state change information indicates that a change in the focus state is not a monotonous change.

Effects of the Invention

According to the present technology, an imaging element including an image output pixel and a phase difference detection pixel is used, and the control unit generates focus state change information indicating whether or not a change in a focus state is a monotonous change, on the basis of focus state information obtained during execution of focus control based on image-plane phase difference information obtained using the phase difference detection pixel over a predetermined period, and continues image-plane phase difference focus control based on the image-plane phase difference information in a case where the focus state change information indicates that a change in the focus state is a monotonous change. Therefore, for example, a frequency of performing an auto-focus operation of a contrast method decreases, and a high-speed and high-quality auto-focus operation becomes possible. Note that the effects described in this specification are merely examples and are not limited, and additional effects may be present.

BRIEF DESCRIPTION OF DRAWINGS

FIGS. 3A, 3B, 3C, and 3D are views illustrating a relationship between a subject and a locus of a lens position and a locus of a defocus amount, in a case where an image-plane phase difference AF operation is performed.

FIGS. 5A and 5B are graphs for explaining a monotonous change of a lens position change amount.

FIGS. 6A, 6B, 6C, and 6D are views showing an operation example of the first embodiment.

FIGS. 7A and 7B are views for explaining parameters to be used for an evaluation function.

MODE FOR CARRYING OUT THE INVENTION

Hereinafter, embodiments for implementing the present technology will be described. It should be noted that the description will be given in the following order.

1. First Embodiment

2. Second Embodiment

3. Third Embodiment

4. Fourth Embodiment

5. Other Embodiment

6. Application Example

1. First Embodiment

Figure 1:
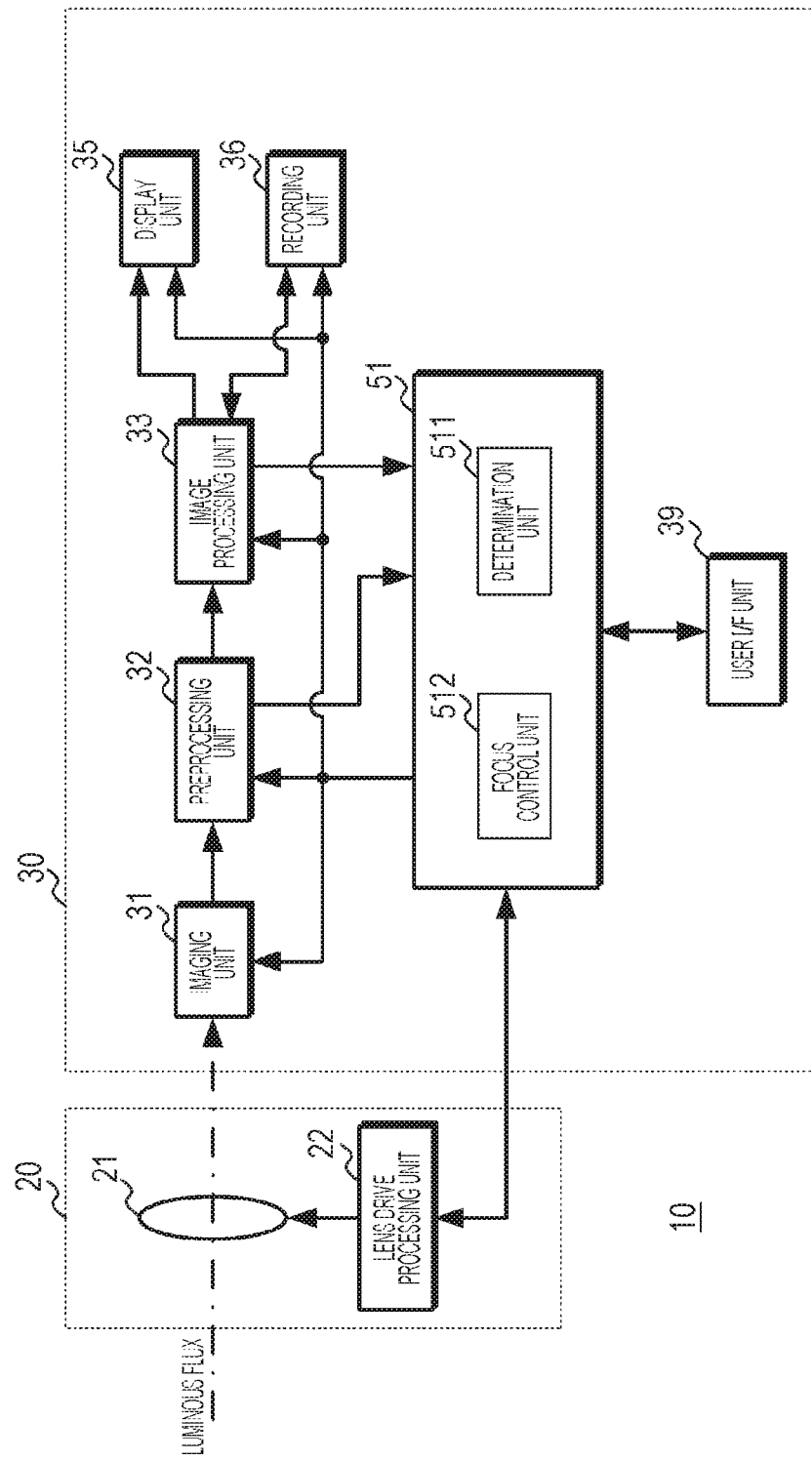
FIG. 1 is a diagram illustrating a configuration of a first embodiment.

Next, a first embodiment of the imaging apparatus of the present technology will be described. FIG. 1 illustrates a configuration of the first embodiment.

An imaging apparatus 10 includes an imaging lens 20 and a main body unit 30. The imaging lens 20 has an imaging optical system 21 and a lens drive processing unit 22. The imaging optical system 21 is configured with use of a focus lens. Furthermore, the imaging optical system 21 may be configured with use of not only the focus lens, but also a zoom lens, an aperture mechanism, and the like.

The lens drive processing unit 22 moves a lens position of the focus lens in the imaging optical system 21 on the basis of a lens control signal from the main body unit 30. Furthermore, the lens drive processing unit 22 generates information and the like indicating an actual lens position (hereinafter referred to as "lens position") of the focus lens, and outputs the information and the like to the main body unit 30.

The main body unit 30 has a configuration including an imaging unit 31, a preprocessing unit 32, an image processing unit 33, a display unit 35, a recording unit 36, a user interface (I/F) unit 39, and a control unit 51. Note that the main body unit 30 may have a functional block that is not described in the figure, and may have a configuration that does not contain some functional block described in the figure.

The imaging unit 31 is configured with use of an imaging element such as a complementary metal oxide semiconductor (CMOS). Furthermore, in the imaging element, an image output pixel and a phase difference detection pixel are provided in an imaging surface. The image output pixel and the phase difference detection pixel are not limited to a case of being provided independently, but may have a configuration in which the image output pixel and the phase difference detection pixel are provided in the imaging surface by providing the image output pixel with a phase difference detection function.

On the imaging surface of the imaging unit 31, subject light from the imaging lens 20 is incident. On the basis of a control signal from the control unit 51 as described later, the imaging unit 31 performs action such as start and end of an exposure operation of the imaging element, output selection of each pixel, and readout of a pixel signal, and the imaging unit 31 generates an image signal indicating a subject that has been imaged by the image output pixel, and generates phase difference information (hereinafter, referred to as "image-plane phase difference information") indicating a phase difference of a phase-difference image, for example, two phase-difference images, generated by the phase difference detection pixel. The imaging unit 31 outputs the generated image signal to the preprocessing unit 32. Furthermore, the imaging unit 31 outputs the generated image-plane phase difference information to the control unit 51.

The preprocessing unit 32 performs predetermined signal processing, for example, noise removal processing, gain adjustment, and clamp processing, on the image signal outputted from the imaging unit 31. Furthermore, the preprocessing unit 32 performs analog/digital conversion processing, and converts an analog image signal subjected to the predetermined signal processing into a digital image signal, to output the digital image signal to the image processing unit 33.

The image processing unit 33 performs, on the image signal outputted from the preprocessing unit 32, predetermined signal processing, for example, signal processing such as black level correction to regard a black level of the digital image signal as a reference black level, white balance control to correct red and blue levels such that a white part of the subject is correctly displayed and recorded as white, and gamma correction to correct a grayscale characteristic of the image signal. The image processing unit 33 outputs the signal-processed image signal to the display unit 35, the recording unit 36, and the control unit 51. Furthermore, the image processing unit 33 may perform coding processing of the image signal and output the image signal to the recording unit 36, and perform decoding processing on the coded signal supplied from the recording unit 36 and output the obtained image signal to the display unit 35.

The display unit 35 displays a captured image on the basis of the image signal processed by the image processing unit 33. Furthermore, the display unit 35 displays a menu screen or the like on the basis of a control signal from the control unit 51. Moreover, the display unit 35 presents to a user, on the basis of a state determination signal from the control unit 51, that a positional deviation of the focus lens with respect to the focus position is in a state of being large, and contrast of the imaged subject is in a state of being low.

The recording unit 36 records the image signal subjected to the signal processing by the image processing unit 33, or the coded signal, on a recording medium. Furthermore, the recording unit 36 may record a RAW image signal before being subjected to the signal processing by the image processing unit 33, on the recording medium. The recording unit 36 reads the image signal or the coded signal recorded on the recording medium, and outputs the image signal or the coded signal to the image processing unit 33.

The user interface unit 39 is configured with use of an operation switch, an operation button, and the like. The user interface unit 39 generates an operation signal according to a user operation and outputs the signal to the control unit 51. Note that the user interface unit 39 is not limited to a case of being provided in the main body unit 30, but may have a configuration of being provided separately from the main body unit 30, and for example, being able to perform transmission or the like of an operation signal to the control unit 51 from a distant position via a communication path or the like.

The control unit 51 is configured with use of, for example, a microcomputer incorporating a storage unit such as a ROM that stores a control program and a flash memory that temporarily stores data. The control unit 51 executes the control program, and controls action of each unit such that action desired by the user is performed by the imaging apparatus 10 on the basis of an operation signal from the user interface unit 39, to perform imaging, recording, and the like of a moving image or a still image.

Furthermore, the control unit 51 performs focus control based on image-plane phase difference information obtained using a phase difference detection pixel over a predetermined period, generates focus state change information indicating whether or not a change in a focus state is a monotonous change, and continues the focus control based on the image-plane phase difference information in a case where the focus state change information indicates that a change in the focus state is a monotonous change. Furthermore, in a case where the focus state change information indicates that a change in the focus state is not a monotonous change, the control unit 51 switches from the focus control based on the image-plane phase difference information to focus control based on information other than the image-plane phase difference information. The control unit 51 has a determination unit 511 and a focus control unit 512 in order to perform an auto-focus operation by such focus control.

The determination unit 511 performs focus control according to the output of the phase difference detection pixel over a predetermined period, and generates focus state change information indicating whether or not a change in a focus state is a monotonous change. The determination unit 511 generates focus change information, on the basis of information indicating an actual lens position of a focus lens acquired from the imaging lens 20, image-plane phase difference information generated with use of the phase difference detection pixel of the imaging unit 31 during execution of the focus control according to an output of the phase difference detection pixel, and the like. The imaging lens 20 may be a lens provided fixedly to the imaging apparatus 10, or may be a removable interchangeable lens. In a case where the imaging lens 20 is an interchangeable lens, the control unit 51 communicates with the interchangeable lens and acquires an actual lens position of the focus lens from the interchangeable lens, and the discrimination unit 511 uses the acquired actual lens position as the focus state change information.

In a case where the focus state change information generated by the determination unit 511 indicates that a change in the focus state is a monotonous change, the focus control unit 512 continues the focus control based on the image-plane phase difference information. Furthermore, in a case where the focus state change information generated by the determination unit 511 indicates that a change in the focus state is not a monotonous change, the focus control unit 512 performs, from the focus control based on the image-plane phase difference information, focus control based on information other than the image-plane phase difference information, for example, focus control of a contrast method based on an image signal supplied from the image processing unit 33. In a case of performing the focus control (image-plane phase difference focus control) based on the image-plane phase difference information, the focus control unit 512 performs an auto-focus operation (hereinafter referred to as "image-plane phase difference AF operation") by generating a focus control signal in accordance with a defocus amount indicated by the image-plane phase difference information and outputting the signal to the lens drive processing unit 22 of the imaging lens 20. Furthermore, in a case of performing focus control (contrast focus control) based on an image signal, the focus control unit 512 performs an auto-focus operation (hereinafter referred to as "contrast AF operation") by generating a focus control signal on the basis of a contrast AF evaluation value calculated using a pixel value of a pixel group in a distance measurement area, and outputting the signal to the lens drive processing unit 22 of the imaging lens 20.

Figure 2:
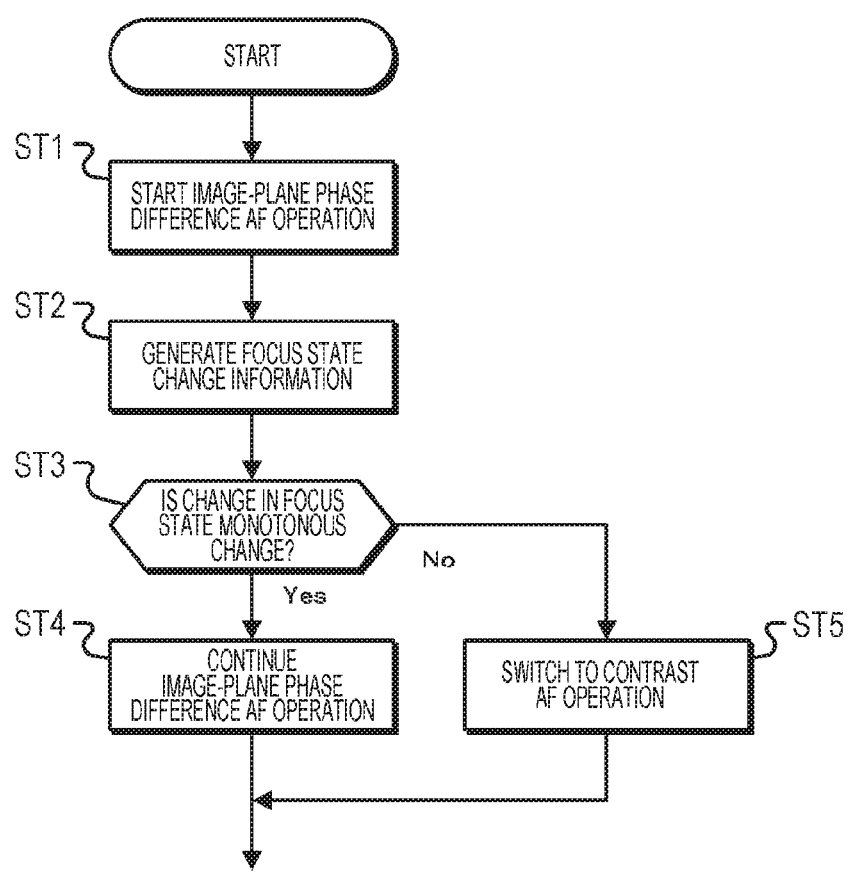
FIG. 2 is a flowchart showing action of the first embodiment.

Next, action of the first embodiment of the imaging apparatus of the present technology will be described. FIG. 2 is a flowchart showing action of the first embodiment. The imaging apparatus starts the action of the flowchart when a shutter operation or shutter action is performed. The shutter operation is, for example, a shutter full-press operation, a shutter half-press operation, or the like performed by the user. The shutter action is shutter action that is performed automatically regardless of a user operation, and is a timer operation, an automatic shutter operation based on a recognition result of a subject, or the like, for example.

In step ST1, the control unit starts the image-plane phase difference AF operation. The control unit 51 starts the image-plane phase difference AF operation, by starting generation of a focus control signal according to a defocus amount indicated by the image-plane phase difference information and outputting the focus control signal to the lens drive processing unit 22 of the imaging lens 20, and proceeds to step ST2.

In step ST2, the control unit generates focus state change information. The control unit 51 performs the image-plane phase difference AF operation started in step ST1 for a predetermined time. Furthermore, the control unit 51 generates focus state change information indicating whether or not a change in the focus state when the image-plane phase difference AF operation is performed for a predetermined time is a monotonous change. The control unit 51 determines whether or not a change in the focus state is a monotonous change with any of, for example, a frequency characteristic of a change amount, a defocus amount indicated by the image-plane phase difference information, a lens position, and a defocus amount and a lens position, and generates focus state change information. Note that details of the generation of the focus state change information will be described later. The control unit 51 generates the focus state change information and proceeds to step ST3.

In step ST3, the control unit determines whether a change in the focus state is a monotonous change. The control unit 51 proceeds to step ST4 in a case where the focus state change information generated in step ST2 indicates being a monotonous change, and proceeds to step ST5 in a case of indicating being not a monotonous change.

In step ST4, the control unit continues the image-plane phase difference AF operation. The control unit 51 continues the image-plane phase difference AF operation, on the assumption of a large blur state (also referred to as "out of focus", "Big Defocus", or "largely defocus") from the fact that the change in the focus state is a monotonous change.

In step ST5, the control unit performs switching to the contrast AF operation. The control unit 51 switches the focus control operation from the image-plane phase difference AF operation to the contrast AF operation, on the assumption of a low-contrast state from the fact that the change in the focus state is not a monotonous change.

Next, generation of the focus state change information will be described. FIGS. 3A, 3B, 3C, and 3D illustrate a relationship between a subject and a locus of a lens position and a locus of a defocus amount, in a case where the image-plane phase difference AF operation is started from a large blur state. FIGS. 3A and 3B show a case where a subject with high contrast is imaged, in which FIG. 3A illustrates a locus of a lens position, and FIG. 3B illustrates a locus of a defocus amount. Furthermore, FIGS. 3C and 3D show a case where a subject with low contrast is imaged from a large blur state, in which FIG. 3C illustrates a locus of a lens position, and FIG. 3D illustrates a locus of a defocus amount. Note that, in FIGS. 3A, 3B, 3C, and 3D, a solid line indicates when a start-time of the image-plane phase difference AF operation is in a large blur state, and a broken line indicates when being in an in-focus state.

A subject with high contrast (not low) refers to a subject with contrast that allows for correct calculation of a phase difference between two images in a case of calculating the phase difference using an output of the phase difference detection pixel. A subject with low contrast refers to a subject in a state where contrast that does not allow for correct calculation of a phase difference between two images due to low contrast in a case of calculating the phase difference by using an output of the phase difference detection pixel.

In a case where the subject with high contrast is imaged, when the image-plane phase difference AF operation is performed, the lens position changes linearly and monotonously as shown by the solid line in FIG. 3A, in other words, the lens position converges to an in-focus position with a linear change that is always in a fixed direction (a direction approaching in-focus). Furthermore, by being affected by delay of reflection of a lens movement according to a lens drive amount, the defocus amount converges to the in-focus position with a non-linear monotonous change as shown by the solid line in FIG. 3B.

Furthermore, in a case where the subject with low contrast is imaged, the image-plane phase difference cannot be calculated correctly when the image-plane phase difference AF operation is performed. Therefore, the defocus amount has a large error, and a value change is not to be in a fixed direction as shown in FIG. 3D. Furthermore, the lens position causes hunting and does not converge to the in-focus position as shown by the solid line in FIG. 3C. Note that, since the change in the lens position is affected by delay of reflection of lens movement according to a lens drive amount, a change frequency is lower than that of the change in the defocus amount. Furthermore, a change frequency of the change in the lens position is lower than that of the change in the defocus amount. Therefore, if focus state change information is generated on the basis of the change in the lens position, the focus state change information can be generated more easily than a case where the focus state change information is generated on the basis of the defocus amount.

As described above, the locus of the lens position and the defocus amount in a case where the subject with high contrast is imaged is a monotonous change toward the in-focus position, and the change is different from that in a case where the subject with low contrast is imaged. Therefore, the determination unit 511 of the control unit 51 generates the focus state change information indicating whether a change in the focus state is a monotonous change, by using a locus of the lens position, the defocus amount, or the like.

Figure 4:
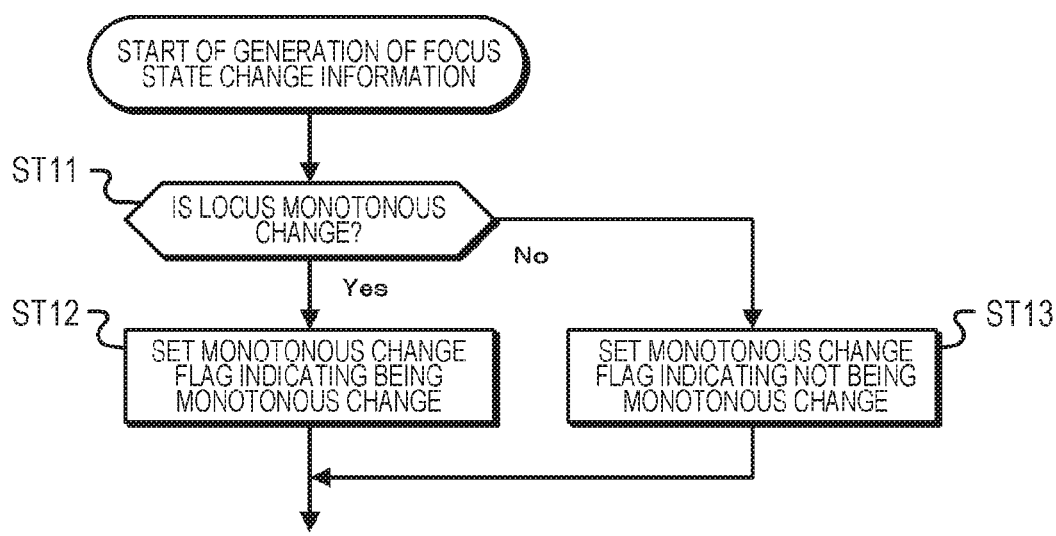
FIG. 4 is a flowchart illustrating action of generating focus state change information.

FIG. 4 is a flowchart illustrating action of generating focus state change information. In step ST11, the determination unit determines whether a locus (change in a focus state) indicates a monotonous change. The determination unit 511 acquires state information regarding the focus state at predetermined intervals during the image-plane phase difference AF operation performed for a predetermined period, and discriminates whether the locus of the lens position, the defocus amount, or the like with respect to an elapsed time indicates a monotonous change, on the basis of the acquired state information. The state information may be, for example, a change amount in the lens position or a change amount in the defocus amount, or may be the lens position itself or the defocus amount itself. Furthermore, the state information may be a frequency characteristic of a change amount in the lens position or a frequency characteristic of a change amount in the defocus amount. The determination unit 511 proceeds to step ST12 in a case where the locus indicates a monotonous change, and proceeds to step ST13 in a case of not indicating a monotonous change.

For example, the determination unit 511 determines whether a change amount is a monotonous change. FIGS. 5A and 5B are graph for explaining a monotonous change of a lens position change amount. Note that, in FIGS. 5A and 5B, change amounts calculated at predetermined intervals in a predetermined period TW are illustrated as black dots. As shown in FIG. 5A, the determination unit 511 determines as being a monotonous change in a case where a polarity of the change amount in the predetermined period TW has not changed from the start-time. Furthermore, as shown in FIG. 5B, the determination unit 511 determines as not being a monotonous change in a case where a polarity of the change amount in the predetermined period TW has changed. Note that, as shown in FIGS. 3A, 3B, 3C, 3D, 5A, and 5B, in a case where the lens position and the defocus amount at the start-time are on a plus side (for example, on a tele side) relative to the in-focus position, it is determined as being a monotonous change when the change amount calculated at predetermined intervals in the predetermined period TW is on a minus side including zero. However, in a case where the lens position and the defocus amount at the start-time are on the minus side (for example, on a wide side) relative to the in-focus position, it is determined as being a monotonous change when the change amount calculated at predetermined intervals in the predetermined period TW is a change amount on the plus side including zero. Furthermore, the change amount is not limited to the lens position change amount, and the change amount in the defocus amount indicated by image-plane phase difference information may be used.

Furthermore, the determination unit 511 may calculate a change inclination of the lens position and the defocus amount at predetermined time intervals in the predetermined period TW, determine as being a monotonous change in a case where an average of accumulated values of the calculated change inclination is equal to or less than a preset threshold value, and determine as not being a monotonous change in a case where the average of the accumulated values exceeds the preset threshold value.

The determination unit 511 may use the lens position without limiting to the change amount. Specifically, it is determined as being a monotonous change in a case where the lens position moves in only one direction from the start-time, and it is determined as not being a monotonous change in a case where the lens position moves in an opposite direction.

Furthermore, the determination unit 511 may determine whether or not a change in the focus state is a monotonous change on the basis of both the defocus amount and the lens position. Since the defocus amount is affected by delay of reflection of a lens movement according to a lens drive amount as described above, it may not be possible to correctly determine whether or not a change in the focus state is a monotonous change when the determination is made on the basis only on the defocus amount. Therefore, if the determination unit 511 determines whether or not a change in the focus state is a monotonous change on the basis of the defocus amount and the lens position, it becomes possible to determine a change in the focus state more correctly.

Moreover, the determination unit 511 may generate the focus state change information by determining whether or not a change in the focus state is a monotonous change on the basis of a frequency characteristic of the change amount without limiting to the change amount and the lens position. For example, by applying a fast fourier transform (FFT) to the lens position itself, the change amount is converted into a frequency component, and it is determined that a change in the focus state is not a monotonous change in a case where the frequency component is equal to or more than a predetermined threshold value. In a case where the frequency component of the change frequency is less than the predetermined threshold value, it is determined that a change in the focus state is a monotonous change.

In step ST12, the determination unit sets a monotonous change flag indicating being a monotonous change. The determination unit 511 sets the monotonous change flag indicating that a change in the focus state is a monotonous change, and ends the processing.

In step ST13, the determination unit sets a monotonous change flag indicating being not a monotonous change. The determination unit 511 sets the monotonous change flag indicating that a change in the focus state is not a monotonous change, and ends the processing.

FIGS. 6A, 6B, 6C, and 6D shows an operation example of the first embodiment. Note that FIGS. 6A and 6B show a large blur state, FIGS. 6C, and 6D show a low-contrast state, FIGS. 6A and 6C show a temporal change in a lens position, and FIGS. 6B and 6D show a temporal change of a lens position change amount, respectively.

The image-plane phase difference AF operation is performed until time point t1 at which the predetermined period Tw passes from time point t0 at which the auto-focus operation is started. Here, as shown in FIG. 6B, in a case where the lens position change amount in the predetermined period does not cause a change in polarity, it is determined as being a monotonous change, and the image-plane phase difference AF operation is continued. Therefore, as shown in FIG. 6A, the lens position is at an in-focus position at time point t2.

Furthermore, as shown in FIG. 6D, in a case where the lens position change amount in the predetermined period causes a change in polarity, it is determined as not being a monotonous change, and the image-plane phase difference AF operation is switched to the contrast AF operation. Therefore, as shown in FIG. 6C, the lens position is at an in-focus position at time point t3.

As described above, according to the first embodiment, in a case where a focus state change information indicates that the focus state change is a monotonous change, in other words, in a case where it is determined as being a large blur state, the image-plane phase difference AF operation is continued. Furthermore, in a case where the focus state change information indicates that the focus state change is not a monotonous change, in other words, in a case where it is determined that the subject has low contrast, the image-plane phase difference AF operation is switched to the contrast AF operation. Therefore, since the switching to the contrast AF operation is performed in a case where the auto-focus operation is difficult in the image-plane phase difference AF operation, it is possible to perform a high-speed and high-quality auto-focus operation by reducing the frequency for performing the contrast AF operation.

2. Second Embodiment

Next, a second embodiment of the imaging apparatus of the present technology will be described. An imaging apparatus of the second embodiment determines reliability of an image-plane phase difference AF operation, and performs switching of an auto-focus operation in accordance with whether or not a change in a focus state is a monotonous change, similarly to the first embodiment, in a case of being reliable. Furthermore, in a case where the image-plane phase difference AF operation is not reliable, the imaging apparatus moves a lens position from one end side to the other end side to perform a search operation of searching for an in-focus position, and moves the lens to the searched in-focus position.

A configuration of the second embodiment is made similar to that of the first embodiment shown in FIG. 1. In the second embodiment, a control unit 51 performs correlation calculation of two images having parallax obtained from an output of a phase difference detection pixel prior to a predetermined period, and determines reliability of a correlation calculation result, in other words, reliability of the image-plane phase difference information, with a determination unit 511. In a case where it is determined that the correlation calculation result is reliable, the control unit 51 performs generation of focus state change information in the determination unit 511 and switching of an auto-focus operation based on the focus state change information in a focus control unit 512. Furthermore, in a case where it is determined as being not reliable, the control unit 51 performs an entire search operation with the focus control unit 512 to search for an in-focus position, and performs lens drive control of moving a focus lens to the searched in-focus position.

In the determination of the reliability of the image-plane phase difference AF operation, correlation calculation of two images having parallax is performed to calculate, for example, a reliability evaluation value. Expression (1) exemplifies an evaluation function for calculating the reliability evaluation value, and FIGS. 7A and 7B are views for explaining parameters to be used for the evaluation function. In Expression (1), "n" represents a total number of image-plane phase difference AF pixel pairs in an AF line Lf in an AF area Ef shown in FIG. 7A, "Xi" represents a position of an i-th image-plane phase difference AF pixel pair from a left end in the AF line Lf, and "Yi" represents a pixel output of an image-plane phase difference AF pixel pair at this position Xi. Note that the image-plane phase difference AF pixel pair is a pair of phase difference detection pixels of the imaging unit 31.

[Formula 1]

$$J = \sum_{i}^{n-1} \left| \frac{Y_{i+1} - Y_i}{X_{i+1} - X_i} \right| \quad (1)$$

FIG. 7B illustrates a configuration of the image-plane phase difference AF pixel pair. Two or more pairs of phase difference detection pixels 311a and 311b having light shielding plates 312a and 312b are arranged along a horizontal direction. In the light shielding plates 312a and 312b, positions of openings OP for separation of a luminous flux Ta from a right-side portion Qa of an exit pupil and a luminous flux Tb from a left-side portion Qb are a mirror target. More particularly, a first phase difference detection pixel 311a having the light shielding plate 312a in which the slit-shaped opening OP is biased to the right side with respect to a photoelectric conversion unit (photodiode) PD directly below, and a second phase difference detection pixel 311b having the light shielding plate 312b in which the slit-shaped opening OP is biased to the left side with respect to the photoelectric conversion unit PD directly below are alternately arranged on the AF line Lf. With this arrangement, the luminous flux Ta from the right-side portion Qa of the exit pupil passes through a microlens ML and the opening OP of the light shielding plate 312a to be received by the photoelectric conversion unit PD of the first phase difference detection pixel 311a, and the luminous flux Tb from the left-side portion Qb of the exit pupil passes through the microlens ML and the opening OP of the light shielding plate 312b to be received by the photoelectric conversion unit PD of the second phase difference detection pixel 311b. In other words, in the image-plane phase difference AF pixel pair configured by the first phase difference detection pixel 311a and the second phase difference detection pixel 311b, the luminous fluxes Ta and Tb of the subject having passed through the right-side portion and the left-side portions (a pair of partial areas) Qa and Qb biased in mutually opposite directions along the horizontal direction are individually received at the exit pupil. Note that, in the case of the configuration shown in FIGS. 7A and 7B, the image-plane phase difference information is information indicating a phase difference between an image sequence of the first phase difference detection pixel sequence and an image sequence of the second phase difference detection pixel sequence.

The control unit 51 determines that the reliability is high in a case where a reliability evaluation value J calculated using Expression (1) is larger than a predetermined threshold value Jth, and determines that the reliability is low in a case where the reliability evaluation value J is equal to or less than the threshold value Jth. As described above, the control unit 51 performs simple reliability evaluation of the image-plane phase difference AF operation on the basis of the reliability evaluation value J.

Figure 8:
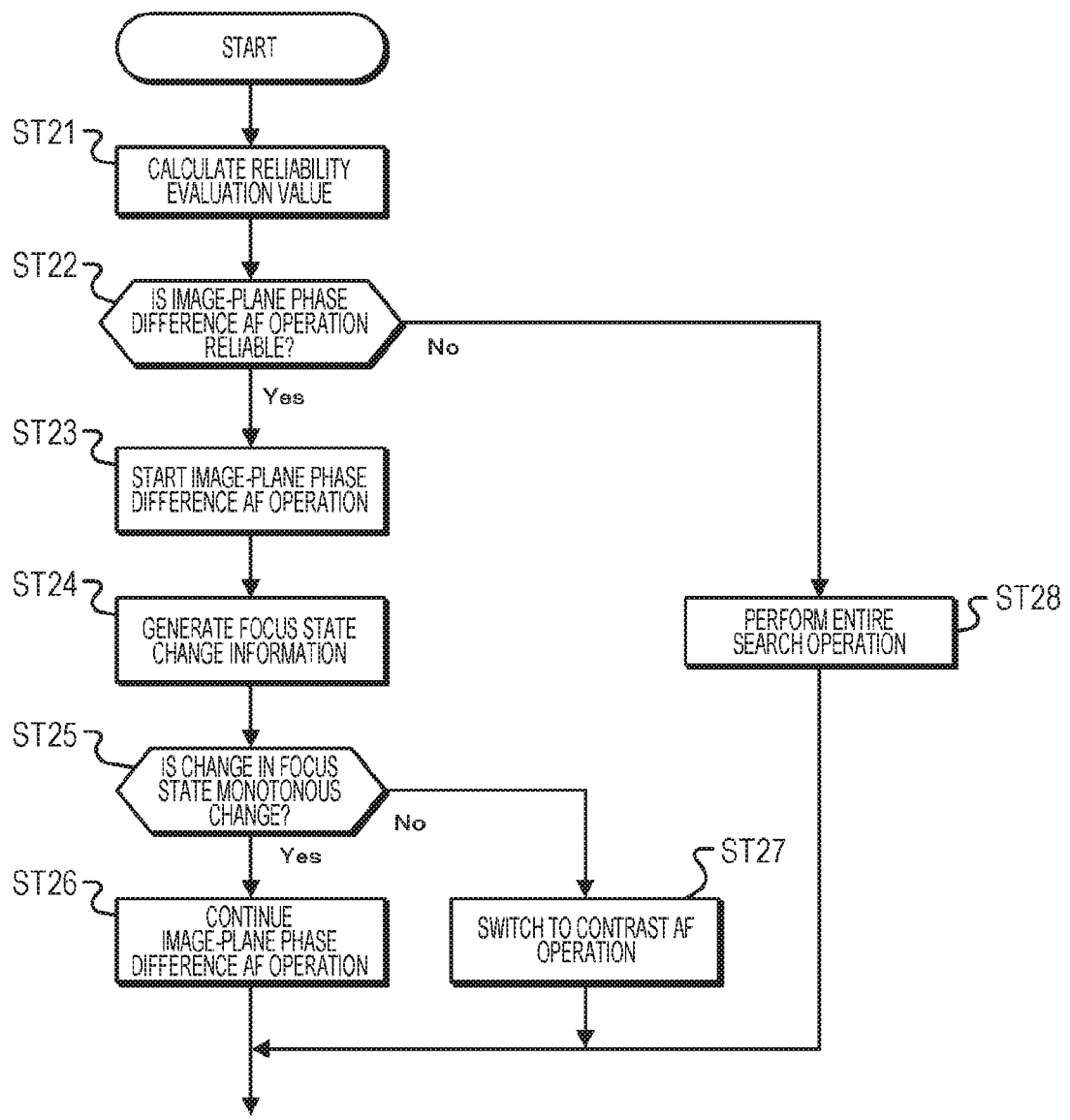
FIG. 8 is a flowchart showing action of a second embodiment.

Next, action of the second embodiment of the imaging apparatus of the present technology will be described. FIG. 8 is a flowchart showing action of the second embodiment. In step ST21, the control unit calculates a reliability evaluation value. Before moving the focus lens, the control unit 51 calculates the reliability evaluation value J by using an evaluation function as described above, and proceeds to step ST22.

In step ST22, the control unit determines whether the image-plane phase difference AF operation is reliable. The control unit 51 compares the reliability evaluation value J calculated in step ST21 with the predetermined threshold value Jth. In a case where the reliability evaluation value J is larger than the threshold value Jth, the control unit 51 determines as being reliable, and proceeds to step ST23. Furthermore, in a case where the reliability evaluation value J is equal to or less than the threshold value Jth, the control unit 51 determines that the reliability is low, and proceeds to step ST28.

In step ST23, the control unit starts the image-plane phase difference AF operation. The control unit 51 starts the image-plane phase difference AF operation, by starting generation of a focus control signal according to a defocus amount indicated by the image-plane phase difference information and outputting the focus control signal to the lens drive processing unit 22 of the imaging lens 20, and proceeds to step ST24.

In step ST24, the control unit generates focus state change information. The control unit 51 performs the image-plane phase difference AF operation started in step ST23 for a predetermined time. Furthermore, the control unit 51 generates focus state change information indicating whether or not a change in the focus state when the image-plane phase difference AF operation is performed for a predetermined time is a monotonous change. For example, on the basis of a lens position or a defocus amount indicated by the image-plane phase difference information, a change amount in the lens position and the defocus amount, a frequency characteristic of the change amount, or the like, the control unit 51 determines whether or not the change in a focus state is a monotonous change and generates the focus state change information. The control unit 51 generates the focus state change information and proceeds to step ST25.

In step ST25, the control unit determines whether a change in the focus state is a monotonous change. The control unit 51 proceeds to step ST26 in a case where the focus state change information generated in step ST24 indicates that a change in the focus state is a monotonous change, and proceeds to step ST27 in a case of indicating that a change in the focus state is not a monotonous change.

In step ST26, the control unit continues the image-plane phase difference AF operation. The control unit 51 continues the image-plane phase difference AF operation, on the assumption of a large blur state from the fact that the change in the focus state is a monotonous change.

In step ST27, the control unit performs switching to the contrast AF operation. The control unit 51 determines as being a low-contrast state from the fact that the change in the focus state is not a monotonous change, and switches the auto-focus operation from the image-plane phase difference AF operation to the contrast AF operation.

When proceeding from step ST22 to step ST28, the control unit performs an entire search operation. The control unit 51 moves a lens position from one end side to the other end side to perform a search operation of searching for an in-focus position, and moves the lens to the searched in-focus position.

Thus, according to the second embodiment, similarly to the first embodiment, the image-plane phase difference AF operation is continued in a case where it is determined as being a large blur state, and the image-plane phase difference AF operation is switched to the contrast AF operation in a case where it is determined that the subject has low contrast. Therefore, since the switching to the contrast AF operation is performed in a case where the auto-focus operation is difficult in the image-plane phase difference AF operation, it is possible to perform a high-speed and high-quality auto-focus operation by reducing the frequency for performing the contrast AF operation. Furthermore, since the reliability of the image-plane phase difference AF operation is determined and the entire search operation is performed in a case of being not reliable, the image-plane phase difference AF operation is not to be performed in a low reliability state, and it is possible to perform a high-speed and high-quality auto-focus operation with high accuracy.

3. Third Embodiment

Next, a third embodiment of the imaging apparatus of the present technology will be described. The third embodiment shows a case of providing a distance-measurement-information generating element provided separately from the above-described imaging unit 31, for example, a dedicated phase difference detection unit.

Figure 9:
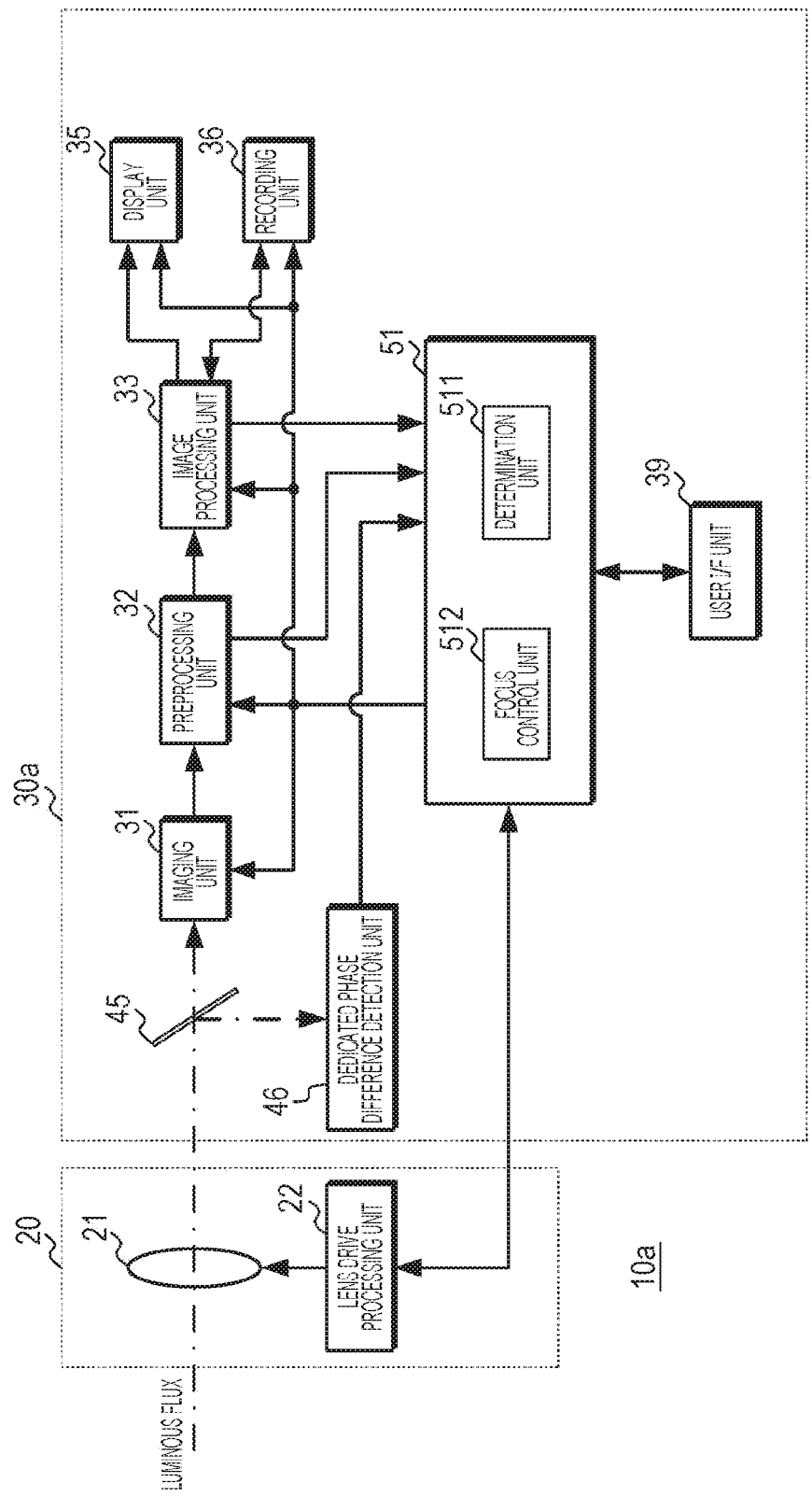
FIG. 9 is a diagram illustrating a configuration of a third embodiment.

FIG. 9 illustrates a configuration of the third embodiment of an imaging apparatus. An imaging apparatus 10a includes an imaging lens 20 and a main body unit 30a. The imaging lens 20 has an imaging optical system 21 and a lens drive processing unit 22. The imaging optical system 21 is configured with use of a focus lens. Furthermore, the imaging optical system 21 may be configured with use of not only the focus lens, but also a zoom lens, an aperture mechanism, and the like.

The lens drive processing unit 22 moves a lens position of the focus lens in the imaging optical system 21, on the basis of a lens control signal from the main body unit 30a. Furthermore, the lens drive processing unit 22 generates information and the like indicating a lens position of the focus lens, and outputs the information and the like to the main body unit 30a.

The main body unit 30a has a configuration including an imaging unit 31, a preprocessing unit 32, an image processing unit 33, a display unit 35, a recording unit 36, a user interface (I/F) unit 39, a transmissive mirror unit 45, a dedicated phase difference detection unit 46, and a control unit 51. Note that the main body unit 30 may have a functional block that is not described in the figure, and may have a configuration that does not contain some functional block described in the figure.

The imaging unit 31 is configured with use of an imaging element such as a complementary metal oxide semiconductor (CMOS). Furthermore, in the imaging element, an image output pixel and a phase difference detection pixel are provided in an imaging surface. On the imaging surface of the imaging unit 31, subject light from the imaging lens 20 is incident via the transmissive mirror unit 45. On the basis of a control signal from the control unit 51 as described later, the imaging unit 31 performs action such as start and end of an exposure operation of the imaging element, output selection of each pixel, and readout of a pixel signal, and the imaging unit 31 generates an image signal indicating a subject that has been imaged by the image output pixel, and generates image-plane phase difference information indicating a phase difference of a phase-difference image, for example, two phase-difference images, generated by the phase difference detection pixel. The imaging unit 31 outputs the generated image signal to the preprocessing unit 32. Furthermore, the imaging unit 31 outputs the generated image-plane phase difference information to the control unit 51.

The preprocessing unit 32 performs predetermined signal processing, for example, noise removal processing, gain adjustment, and clamp processing, on the image signal outputted from the imaging unit 31. Furthermore, the preprocessing unit 32 performs analog/digital conversion processing, and converts an analog image signal subjected to the predetermined signal processing into a digital image signal, to output the digital image signal to the image processing unit 33.

The image processing unit 33 performs, on the image signal outputted from the preprocessing unit 32, predetermined signal processing, for example, signal processing such as black level correction to regard a black level of the digital image signal as a reference black level, white balance control to correct red and blue levels such that a white part of the subject is correctly displayed and recorded as white, and gamma correction to correct a grayscale characteristic of the image signal. The image processing unit 33 outputs the signal-processed image signal to the display unit 35, the recording unit 36, and the control unit 51. Furthermore, the image processing unit 33 may perform coding processing of the image signal and output the image signal to the recording unit 36, and perform decoding processing on the coded signal supplied from the recording unit 36 and output the obtained image signal to the display unit 35.

The display unit 35 displays a captured image on the basis of the image signal processed by the image processing unit 33. Furthermore, the display unit 35 displays a menu screen or the like on the basis of a control signal from the control unit 51. Moreover, the display unit 35 presents to a user, on the basis of a state determination signal from the control unit 51, that a positional deviation of the focus lens with respect to the focus position is in a state of being large, and contrast of the imaged subject is in a state of being low.

The recording unit 36 records the image signal subjected to the signal processing by the image processing unit 33, or the coded signal, on a recording medium. Furthermore, the recording unit 36 reads the image signal or the coded signal recorded on the recording medium, and outputs the image signal or the coded signal to the image processing unit 33.

The user interface unit 39 is configured with use of an operation switch, an operation button, and the like. The user interface unit 39 generates an operation signal according to a user operation and outputs the signal to the control unit 51.

The transmissive mirror unit 45 is provided on an imaging surface side of the imaging unit 31, and causes subject light from the imaging lens 20 to be divided and incident on the imaging unit 31 and the dedicated phase difference detection unit 46.

The dedicated phase difference detection unit 46 is provided with, for example, a secondary image formation lens and a pair of AF sensors. The dedicated phase difference detection unit 46 generates dedicated sensor phase difference information indicating a phase difference of a sensor output signal generated by each of the pair of AF sensors in accordance with subject light incident through the transmissive mirror unit 45 and outputs the information to the control unit 51.

The control unit 51 is configured with use of, for example, a microcomputer incorporating a storage unit such as a ROM that stores a control program and a flash memory that temporarily stores data. The control unit 51 executes the control program, and controls action of each unit such that action desired by the user is performed by the imaging apparatus 10 on the basis of an operation signal from the user interface unit 39. Furthermore, the control unit 51 performs focus control (distance measurement information focus control) on the basis of the image-plane phase difference information supplied from the preprocessing unit 32 or dedicated sensor phase difference information supplied from the dedicated phase difference detection unit 46.

Here, in a case of performing focus control on the basis of the dedicated sensor phase difference information supplied from the dedicated phase difference detection unit 46, the AF sensor of the dedicated phase difference detection unit 46 is provided at a position different from the imaging surface of the imaging unit 31. Therefore, in a case of performing an auto-focus operation (hereinafter referred to as "dedicated phase difference AF operation") by generating a focus control signal in accordance with a defocus amount indicated by the dedicated sensor phase difference information from the dedicated phase difference detection unit 46 and outputting the signal to the lens drive processing unit 22 of the imaging lens 20, accuracy may be deteriorated as compared to the case of image-plane phase difference AF operation. Furthermore, since the AF sensor of the dedicated phase difference detection unit 46 is provided at a position different from the imaging surface of the imaging unit 31, reduced blur can be set as compared with the case of using a phase difference detection pixel of the imaging unit 31. Accordingly, it is possible to widely set a focus lens position range in which a large blur does not occur, in other words, the phase difference detection range. Therefore, in the dedicated phase difference AF operation, the auto-focus operation can be performed even in a case where the blur is large as compared with the image-plane phase difference AF operation.

The control unit 51 has a determination unit 511 and a focus control unit 512 in order to perform the auto-focus operation.

The determination unit 511 performs correlation calculation of two images having parallax obtained from an output of the phase difference detection pixel prior to a predetermined period, and determines reliability of a correlation calculation result, in other words, reliability of the image-plane phase difference information. In a case where it is discriminated that the image-plane phase difference information is reliable, the determination unit 511 performs focus control according to an output of the phase difference detection pixel over a predetermined period, and generates focus state change information indicating whether or not a change in a focus state is a monotonous change. The determination unit 511 generates focus change information on the basis of information indicating a lens position acquired from the imaging lens 20, or image-plane phase difference information generated with use of the phase difference detection pixel of the imaging unit 31 during execution of the focus control according to an output of the phase difference detection pixel, and the like. Furthermore, in a case where it is discriminated that the image-plane phase difference information is not reliable, the determination unit 511 notifies the focus control unit 512 of being not reliable.

In a case where the focus state change information generated by the determination unit 511 indicates that a change in a focus state is a monotonous change, the focus control unit 512 continues the focus control based on the image-plane phase difference information generated by the imaging unit 31. Furthermore, in a case where the focus state change information generated by the determination unit 511 indicates that a change in the focus state is not a monotonous change, the focus control unit 512 switches from the focus control based on the image-plane phase difference information generated by the imaging unit 31 to focus control based on the dedicated sensor phase difference information generated by the dedicated phase difference detection unit 46. Furthermore, in a case where it is determined that the image-plane phase difference information is not reliable, the focus control unit 511 performs an entire search operation of searching for an in-focus position, and performs lens drive control of moving the focus lens to the searched in-focus position.

Figure 10:
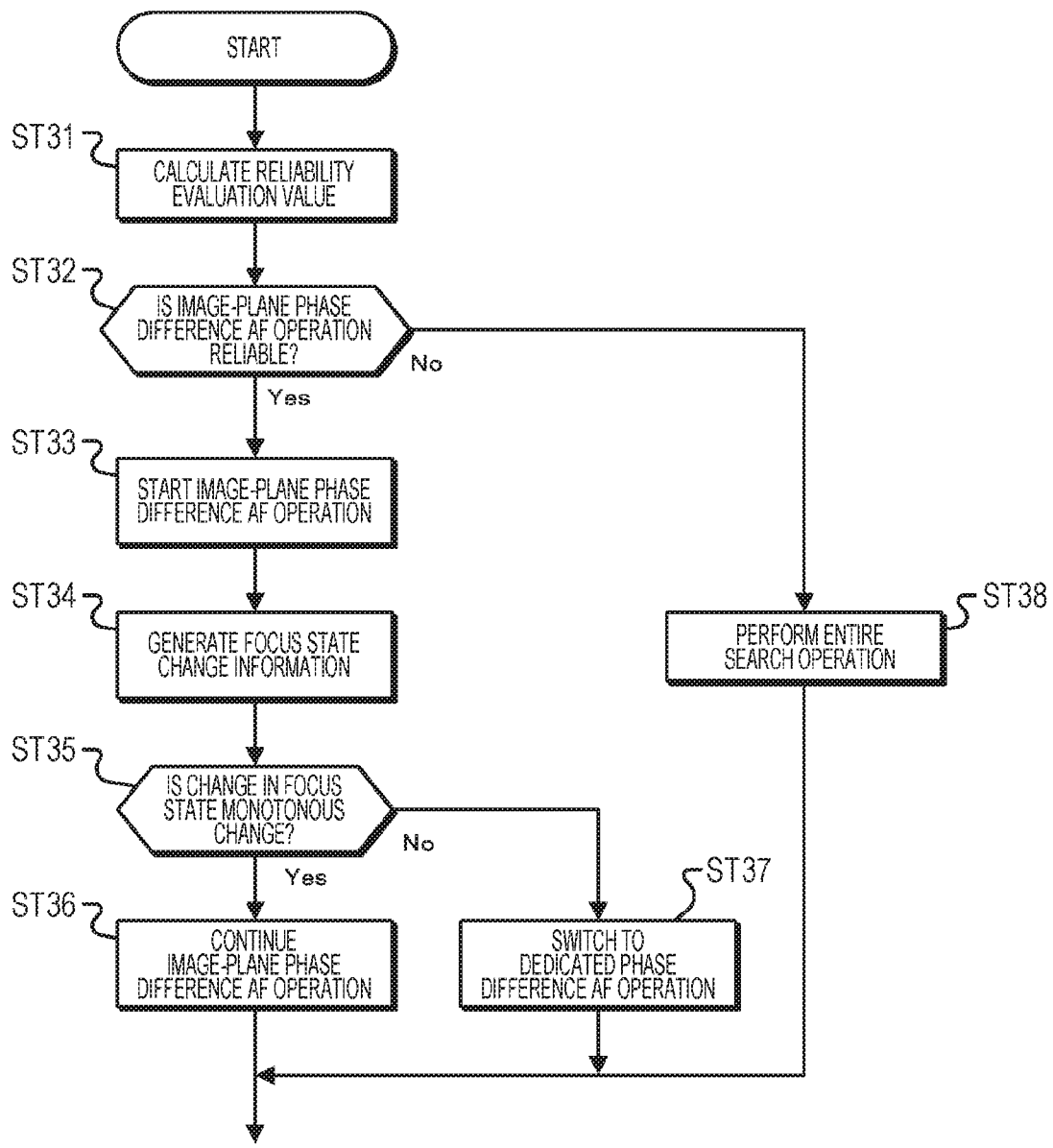
FIG. 10 is a flowchart showing action of the third embodiment.

Next, action of the third embodiment of the imaging apparatus of the present technology will be described. FIG. 10 is a flowchart showing action of the third embodiment. In step ST31, the control unit calculates a reliability evaluation value. The control unit 51 calculates a reliability evaluation value J by using an evaluation function as described above, and proceeds to step ST32.

In step ST32, the control unit determines whether the image-plane phase difference AF operation is reliable. The control unit 51 compares the reliability evaluation value J calculated in step ST31 with a predetermined threshold value Jth. In a case where the reliability evaluation value J is larger than the threshold value Jth, the control unit 51 determines as being reliable, and proceeds to step ST33. Furthermore, in a case where the reliability evaluation value J is equal to or less than the threshold value Jth, the control unit 51 determines that the reliability is low, and proceeds to step ST38.

In step ST33, the control unit starts the image-plane phase difference AF operation. The control unit 51 starts the image-plane phase difference AF operation, by starting generation of a focus control signal according to a defocus amount indicated by the image-plane phase difference information and outputting the focus control signal to the lens drive processing unit 22 of the imaging lens 20, and proceeds to step ST34.

In step ST34, the control unit generates focus state change information. The control unit 51 performs the image-plane phase difference AF operation started in step ST33 for a predetermined time. Furthermore, the control unit 51 generates focus state change information indicating whether or not a change in the focus state when the image-plane phase difference AF operation is performed for a predetermined time is a monotonous change. For example, on the basis of a lens position or a defocus amount indicated by the image-plane phase difference information, a change amount in the lens position and the defocus amount, a frequency characteristic of the change amount, or the like, the control unit 51 determines whether or not the change in a focus state is a monotonous change and generates the focus state change information. The control unit 51 generates the focus state change information and proceeds to step ST35.

In step ST35, the control unit determines whether a change in the focus state is a monotonous change. The control unit 51 proceeds to step ST36 in a case where the focus state change information generated in step ST34 indicates that a change in the focus state is a monotonous change, and proceeds to step ST37 in a case of indicating that a change in the focus state is not a monotonous change.

In step ST36, the control unit continues the image-plane phase difference AF operation. The control unit 51 continues the image-plane phase difference AF operation, on the assumption of a large blur state from the fact that the change in the focus state is a monotonous change.

In step ST37, the control unit performs switching to the dedicated phase difference AF operation. On the assumption of a low-contrast state from the fact that the change in the focus state is not a monotonous change, the control unit 51 switches the focus control operation from the image-plane phase difference AF operation to the dedicated phase difference AF operation having high performance for blurring.

When proceeding from step ST32 to step ST38, the control unit performs an entire search operation. The control unit 51 moves a lens position from one end side to the other end side to perform a search operation of searching for an in-focus position, and moves the lens to the searched in-focus position.

As described above, according to the third embodiment, the image-plane phase difference AF operation is continued in a case where it is determined as being a large blur state, and the image-plane phase difference AF operation is switched to the dedicated phase difference AF operation in a case where it is determined that the subject has low contrast. Therefore, even in a case where the auto-focus operation is difficult in the focus control based on the image-plane phase difference information, the auto-focus operation is enabled by the focus control based on dedicated phase difference information, and it is possible to widen a blur range in which a high-speed and high-quality auto-focus operation is possible.

Furthermore, the reliability of the image-plane phase difference AF operation is determined in the third embodiment, but the action may be such that the determination of the reliability of the image-plane phase difference AF operation is not performed, similarly to the first embodiment. Note that, in a case of determining the reliability of the image-plane phase difference AF operation, the entire search operation is performed when it is determined that the image-plane phase difference AF operation is not reliable. Therefore, the image-plane phase difference AF operation is not to be performed in a low reliability state, and it is possible to perform a high-speed and high-quality auto-focus operation with high accuracy.

Note that the third embodiment exemplifies a case of a configuration in which the transmissive mirror is used, but a reflection mirror may be used in the configuration. In this case, in a case where the image-plane phase difference AF operation is started by causing subject light to be incident on the imaging unit 31, and it is discriminated that switching to the dedicated phase difference AF operation is to be performed, it is sufficient that the subject light is made incident on the dedicated phase difference detection unit 46 by the reflection mirror.

4. Fourth Embodiment

In a fourth embodiment of the imaging apparatus of the present technology, a case of performing a hybrid AF operation will be described. In the hybrid AF operation, a focus control is performed by enabling switching of different methods of focus control, performing focus control using any of the methods, and thereafter, switching to another method such that the focus control can be performed with high accuracy. For example, in the fourth embodiment, a case is exemplified in which the focus control is performed by switching from a contrast method to an image-plane phase difference AF operation.

Figure 11:
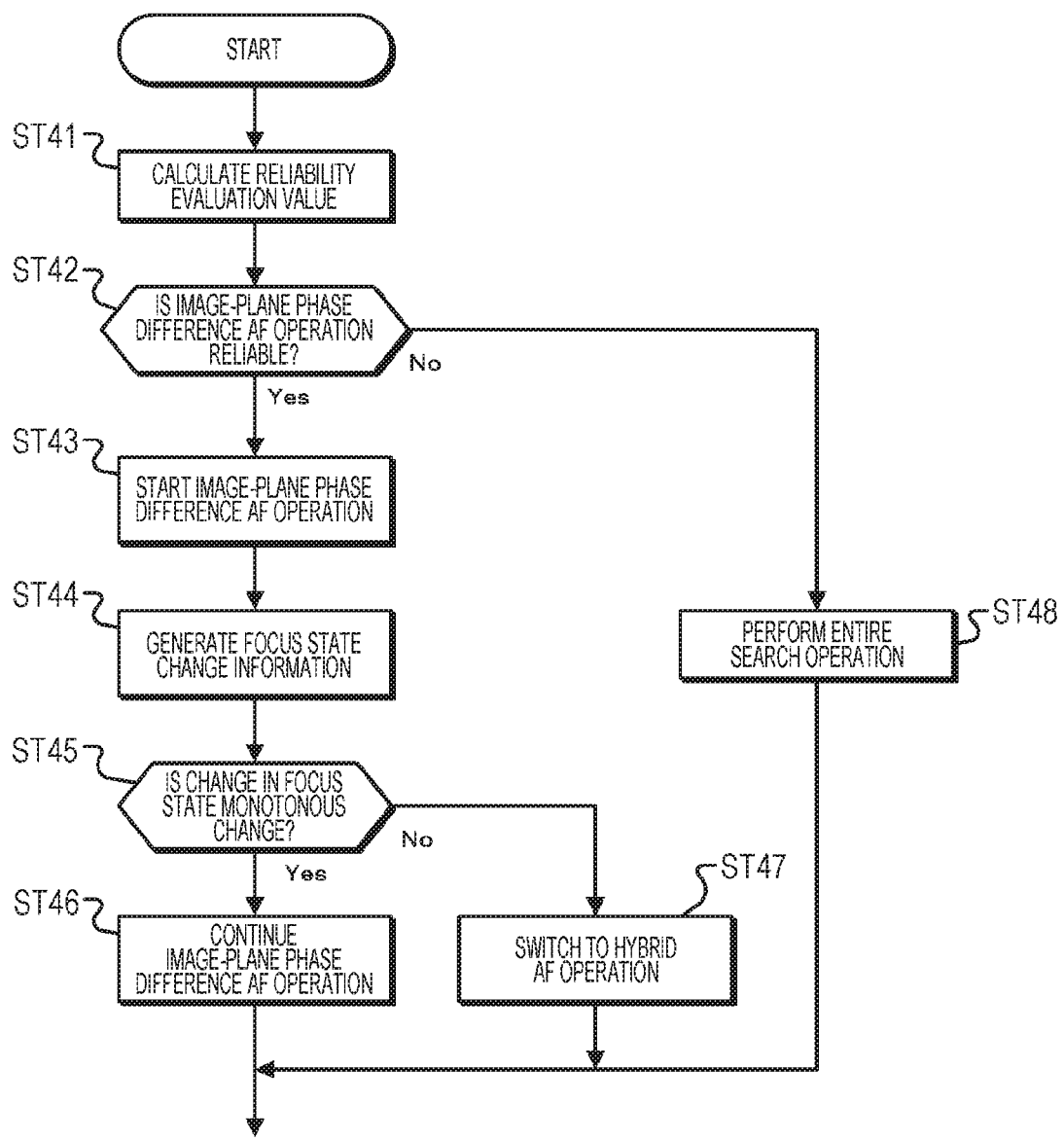
FIG. 11 is a flowchart showing action of a fourth embodiment.

A configuration of the fourth embodiment is made similar to that of the first embodiment shown in FIG. 1. FIG. 11 is a flowchart showing action of the fourth embodiment. In step ST41, the control unit calculates a reliability evaluation value. The control unit 51 calculates a reliability evaluation value J by using an evaluation function as described above, and proceeds to step ST42.

In step ST42, the control unit determines whether the image-plane phase difference AF operation is reliable. The control unit 51 compares the reliability evaluation value J calculated in step ST41 with a predetermined threshold value Jth. In a case where the reliability evaluation value J is larger than the threshold value Jth, the control unit 51 determines as being reliable, and proceeds to step ST43. Furthermore, in a case where the reliability evaluation value J is equal to or less than the threshold value Jth, the control unit 51 determines that the reliability is low, and proceeds to step ST48.

In step ST43, the control unit starts the image-plane phase difference AF operation. The control unit 51 starts the image-plane phase difference AF operation, by starting generation of a focus control signal according to a defocus amount indicated by image-plane phase difference information and outputting the focus control signal to the lens drive processing unit 22 of the imaging lens 20, and proceeds to step ST44.

In step ST44, the control unit generates focus state change information. The control unit 51 performs the image-plane phase difference AF operation started in step ST43 for a predetermined time. Furthermore, the control unit 51 generates focus state change information indicating whether or not a change in the focus state when the image-plane phase difference AF operation is performed for a predetermined time is a monotonous change. For example, on the basis of a lens position or a defocus amount indicated by the image-plane phase difference information, a change amount in the lens position and the defocus amount, a frequency characteristic of the change amount, or the like, the control unit 51 determines whether or not the change in a focus state is a monotonous change and generates the focus state change information. The control unit 51 generates the focus state change information and proceeds to step ST45.

In step ST45, the control unit determines whether a change in the focus state is a monotonous change. The control unit 51 proceeds to step ST46 in a case where the focus state change information generated in step ST44 indicates that a change in the focus state is a monotonous change, and proceeds to step ST47 in a case of indicating that a change in the focus state is not a monotonous change.

In step ST46, the control unit continues the image-plane phase difference AF operation. The control unit 51 continues the image-plane phase difference AF operation, on the assumption of a large blur state from the fact that the change in the focus state is a monotonous change.

In step ST47, the control unit performs switching to the hybrid AF operation. On the assumption of a low-contrast state from the fact that the change in the focus state is not a monotonous change, the control unit 51 switches the focus control operation from the image-plane phase difference AF operation to the hybrid AF operation.

In the hybrid AF operation, the contrast AF operation in which a focus controllable range is wider than that of the image-plane phase difference AF operation in a low-contrast state is performed. The control unit performs the contrast AF operation by generating a focus control signal on the basis of a contrast AF evaluation value calculated using a pixel value of a pixel group in a distance measurement area, and outputting the signal to the lens drive processing unit 22 of the imaging lens 20. The control unit calculates a difference absolute value between adjacent pixels by using, for example, pixels of the pixel group in the distance measurement area, and uses the sum of the calculated difference absolute values as the contrast AF evaluation value. The control unit sequentially calculates the contrast AF evaluation value while moving the focus lens in a fixed direction, and moves the focus lens to the in-focus position with higher accuracy by switching to the image-plane phase difference AF operation with higher accuracy than that of the contrast method in a case where the contrast AF evaluation value monotonously increases and then exceeds the peak.

When proceeding from step ST42 to step ST48, the control unit performs an entire search operation. The control unit 51 moves a lens position from one end side to the other end side to perform a search operation of searching for an in-focus position, and moves the lens to the searched in-focus position.

As described above, according to the fourth embodiment, the image-plane phase difference AF operation is continued in a case where it is determined as being a large blur state, and the image-plane phase difference AF operation is switched to the dedicated phase difference AF operation in a case where it is determined that the subject has low contrast.

Therefore, the focus control becomes possible by the hybrid AF operation even in a case where the focus control is difficult in the image-plane phase difference AF operation, and it is possible to perform a high-speed and high-quality auto-focus operation.

Note that the reliability of the image-plane phase difference AF operation is determined at the start-time of the auto-focus operation in the fourth embodiment, but the action may be such that the determination of the reliability of the image-plane phase difference AF operation is not performed, similarly to the first embodiment. Furthermore, in this case, in the hybrid AF operation, the reliability of the image-plane phase difference AF operation is determined when the contrast AF operation is switched to the image-plane phase difference AF operation. If switching of the auto-focus operation is to be performed in a case where it is determined as being reliable in this determination, it is possible to prevent occurrence of a focus shift due to switching from the contrast AF operation to the image-plane phase difference AF operation.

Furthermore, in a case of determining the reliability of the image-plane phase difference AF operation at the start-time of the auto-focus operation, the entire search operation is performed when it is determined that the image-plane phase difference AF operation is not reliable. Therefore, the image-plane phase difference AF operation is not to be performed in a low reliability state, and it is possible to perform a high-speed and high-quality auto-focus operation with high accuracy.

5. Other Embodiments

Furthermore, in the above embodiment, a case has been described in which the contrast AF operation or the dedicated phase difference AF operation is performed as another auto-focus operation different from the image-plane phase difference AF operation. However, for example, an auto-focus operation and the like may be performed to drive the focus lens on the basis of a distance measurement result by using a distance measurement sensor and the like as a distance-measurement-information generating element provided separately from the imaging unit.

Furthermore, in the above embodiment, a case has been stated in which the image-plane phase difference AF operation is automatically switched to another auto-focus operation in accordance with a state determination result of the determination unit 511. However, the state determination result of the determination unit 511 may be presented to the user from an information presentation unit, and the user may be allowed to select what kind of focus operation is to be performed by using the presented state determination result.

In a case where the configuration of the imaging apparatus is the configuration illustrated in FIG. 1, the determination unit 511 controls presentation of the state determination result by the information presentation unit that presents a state determination result to the user. For example, the determination unit 511 outputs an image signal indicating the state determination result to the display unit 35, which is the information presentation unit, to present the state determination result to the user with an image. Furthermore, by using the user interface unit 39 as the information presentation unit and outputting information indicating the state determination result to outside, the determination unit 511 may be able to present the state determination result to the user by the user interface unit 39.

The user is allowed to perform a high-precision auto-focus operation by operating the imaging apparatus on the basis of the state determination result presented with user of the display unit 35, the user interface unit 39, and the like. For example, in a case where a change in the focus state is not a monotonous change, a zoom operation or the like is performed such that a subject with high contrast is included in the distance measurement area, thereafter, a position of the focusing lens is fixed at the in-focus position, and then an operation in a reverse direction is performed. If the user performs such an operation, it is possible to accurately focus on a subject with low contrast in which a change in the focus state is not a monotonous change.

6. Application Example

Furthermore, the technology according to the present disclosure can be applied to various products. For example, the technology according to the present disclosure may be applied to an operating room system.

Figure 12:
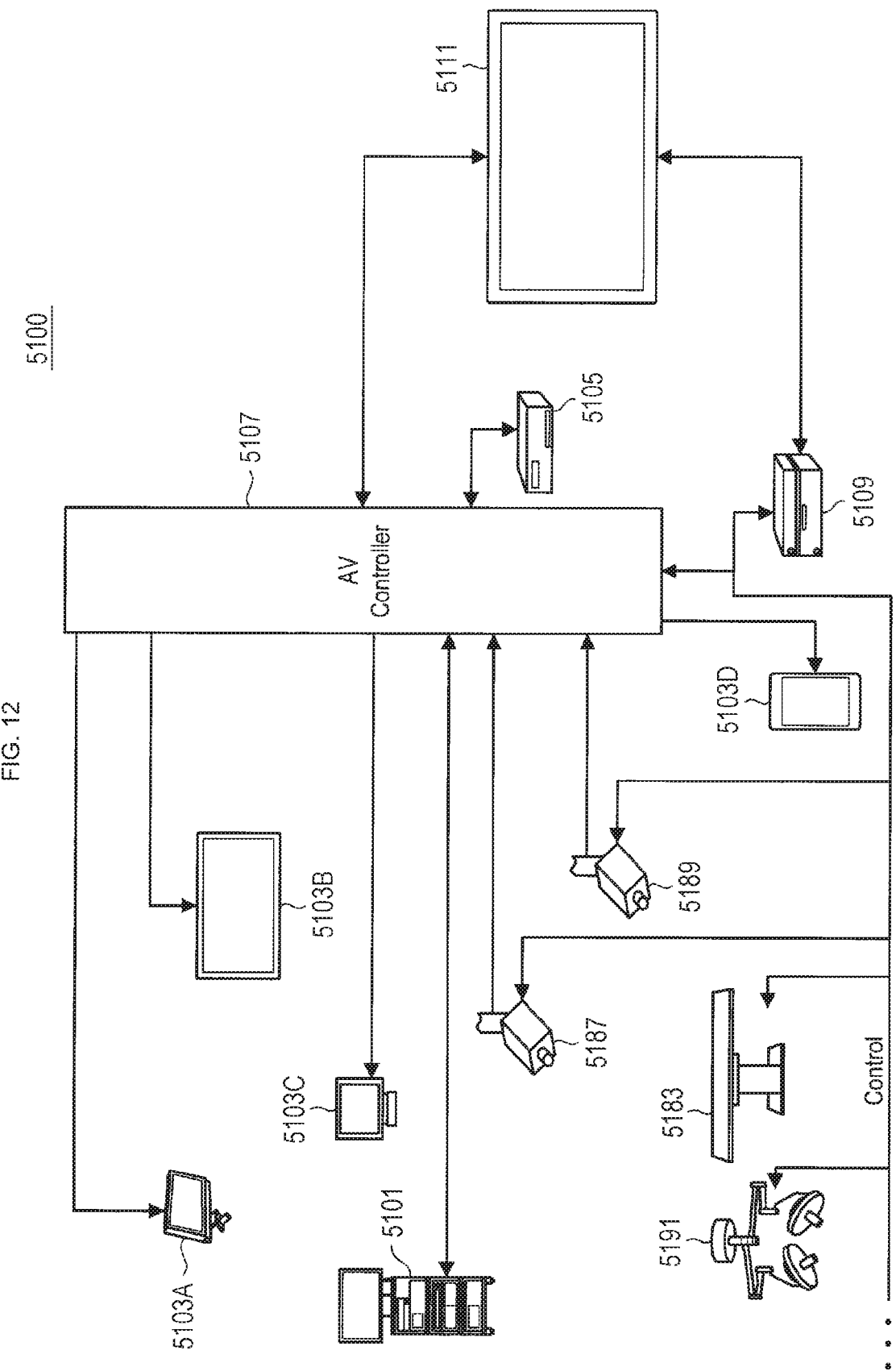
FIG. 12 is a diagram schematically showing an overall configuration of an operating room system.

FIG. 12 is a diagram schematically showing an overall configuration of an operating room system 5100 to which the technology according to the present disclosure can be applied. Referring to FIG. 12, the operating room system 5100 is configured by connecting a device group installed in the operating room to be able to cooperate with each other via an audiovisual controller (AV controller) 5107 and an operating room control device 5109.

In the operating room, various devices can be installed. FIG. 12 illustrates, as an example, a device group 5101 of various types for endoscopic surgery, a ceiling camera 5187 provided on a ceiling of the operating room to image an operator's hand, an operation-place camera 5189 provided on the ceiling of the operating room to image a state of the entire operating room, a plurality of display devices 5103A to 5103D, a recorder 5105, a patient bed 5183, and an illumination lamp 5191.

Here, among these devices, the device group 5101 belongs to an endoscopic surgery system 5113 as described later, and includes an endoscope and a display device or the like that displays an image captured by the endoscope. Each device belonging to the endoscopic surgery system 5113 is also referred to as a medical device. On the other hand, the display devices 5103A to 5103D, the recorder 5105, the patient bed 5183, and the illumination lamp 5191 are devices provided separately from the endoscopic surgery system 5113, for example, in the operating room. Each of the devices that do not belong to the endoscopic surgery system 5113 is also referred to as a non-medical device.

The audiovisual controller 5107 and/or the operating room control device 5109 control action of these medical devices and non-medical devices in cooperation with each other.

The audiovisual controller 5107 integrally controls processing related to image display in the medical devices and the non-medical devices. Specifically, among the devices included in the operating room system 5100, the device group 5101, the ceiling camera 5187, and the operation-place camera 5189 may be devices (hereinafter, also referred to as transmission source devices) having a function of transmitting information (hereinafter, also referred to as display information) to be displayed during the surgery. Furthermore, the display devices 5103A to 5103D may be devices to which display information is outputted (hereinafter, also referred to as output destination devices). Furthermore, the recorder 5105 may be a device corresponding to both the transmission source device and the output destination device. The audiovisual controller 5107 has a function of controlling action of the transmission source device and the output destination device, acquiring display information from the transmission source device, transmitting the display information to the output destination device, and controlling to display and record the display information. Note that the display information is various images captured during the surgery, various types of information regarding the surgery (for example, physical information of the patient, information regarding a past examination result, an operative procedure, and the like), and the like.

Specifically, from the device group 5101 to the audiovisual controller 5107, as the display information, information may be transmitted regarding an image of an operative site in the patient's body cavity imaged by the endoscope. Furthermore, from the ceiling camera 5187, as display information, information regarding an image of the operator's hand imaged by the ceiling camera 5187 may be transmitted. Furthermore, from the operation-place camera 5189, as display information, information regarding an image indicating a state of the entire operating room imaged by the operation-place camera 5189 may be transmitted. Note that, in a case where there is another device having an imaging function in the operating room system 5100, the audiovisual controller 5107 may also acquire information regarding an image captured by the another device as the display information also from the another device.

Alternatively, for example, in the recorder 5105, information about these images captured in the past is recorded by the audiovisual controller 5107. The audiovisual controller 5107 can acquire information regarding the image captured in the past from the recorder 5105, as display information. Note that the recorder 5105 may also record various types of information regarding the surgery in advance.

The audiovisual controller 5107 causes at least any of the display devices 5103A to 5103D, which are output destination devices, to display the acquired display information (in other words, an image photographed during the surgery and various types of information regarding the surgery). In the illustrated example, the display device 5103A is a display device installed to be suspended from the ceiling of the operating room, the display device 5103B is a display device installed on a wall of the operating room, the display device 5103C is a display device installed on a desk in the operating room, and the display device 5103D is a mobile device (for example, a tablet personal computer (PC)) having a display function.

Furthermore, although illustration is omitted in FIG. 12, the operating room system 5100 may include an apparatus external to the operating room. The apparatus external to the operating room may be, for example, a server connected to a network constructed inside or outside a hospital, a PC to be used by medical staff, a projector installed in a conference room of the hospital, or the like. In a case where such an external device is present outside the hospital, the audiovisual controller 5107 can also causes a display device of another hospital to display the display information, via a video conference system or the like, for telemedicine.

The operating room control device 5109 integrally controls processing other than the processing related to the image display in the non-medical device. For example, the operating room control device 5109 controls driving of the patient bed 5183, the ceiling camera 5187, the operation-place camera 5189, and the illumination lamp 5191.

The operating room system 5100 is provided with a centralized operation panel 5111, and, via the centralized operation panel 5111, the user can give instructions regarding the image display to the audiovisual controller 5107 and give instructions regarding action of the non-medical device to the operating room control device 5109. The centralized operation panel 5111 is configured by providing a touch panel on a display surface of the display device.

Figure 13:
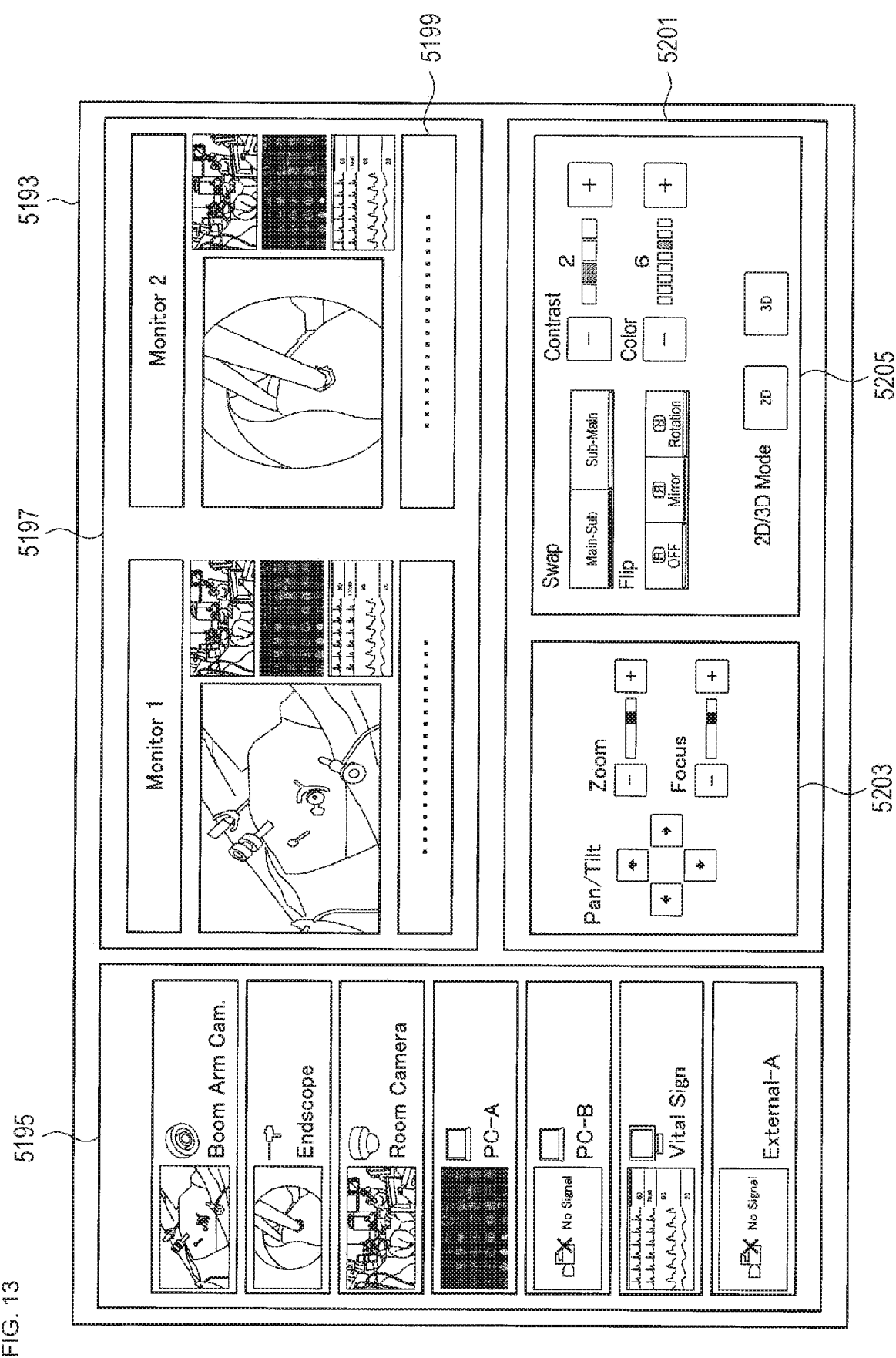
FIG. 13 is a view showing a display example of an operation screen on a centralized operation panel.

FIG. 13 is a view showing a display example of an operation screen on the centralized operation panel 5111. FIG. 13 shows, as an example, an operation screen corresponding to a case where two display devices are provided as an output destination device in the operating room system 5100. Referring to FIG. 13, an operation screen 5193 is provided with a transmission source selection area 5195, a preview area 5197, and a control area 5201.

In the transmission source selection area 5195, transmission source devices provided in the operating room system 5100 and thumbnail screens showing display information of the transmission source devices are displayed in association with each other. The user can select display information desired to be displayed on the display device from any of the transmission source devices displayed in the transmission source selection area 5195.

In the preview area 5197, preview of screens displayed on two display devices (Monitor 1 and Monitor 2), which are output destination devices, is displayed. In the illustrated example, four images are displayed in PinP on one display device. The four images correspond to the display information transmitted from the transmission source device selected in the transmission source selection area 5195. Among the four images, one is displayed relatively large as a main image, and the remaining three are displayed relatively small as sub images. The user can replace the main image with the sub image by appropriately selecting the area where the four images are displayed. Furthermore, in a lower part of the area where four images are displayed, a status display area 5199 is provided, and a status regarding the surgery (for example, an elapsed time of the surgery, physical information of the patient, and the like) can be appropriately displayed in the area.

The control area 5201 is provided with: a transmission source operation area 5203 in which a graphical user interface (GUI) component for performing an operation on a transmission source device is displayed; and an output destination operation area 5205 in which a GUI component for performing an operation on an output destination device is displayed. In the illustrated example, the transmission source operation area 5203 is provided with a GUI component for performing various operations (pan, tilt, and zoom) on a camera in the transmission source device having an imaging function. The user can operate action of the camera in the transmission source device by appropriately selecting these GUI components. Note that, although illustration is omitted, in a case where the transmission source device selected in the transmission source selection area 5195 is a recorder (in other words, in a case where an image recorded in the past on the recorder is displayed in the preview area 5197), the transmission source operation area 5203 may be provided with a GUI component for performing operations such as reproduction, reproduction stop, rewind, and fast forward of the image.

Furthermore, the output destination operation area 5205 is provided with a GUI component for performing various operations (swap, flip, color adjustment, contrast adjustment, switching of 2D display and 3D display) on display on the display device, which is the output destination device. The user can operate display on the display device, by appropriately selecting these GUI components.

Note that the operation screen displayed on the centralized operation panel 5111 is not limited to the illustrated example, and the user may be able to perform, via the centralized operation panel 5111, operation input to each device that may be controlled by the audiovisual controller 5107 and the operating room control device 5109, provided in the operating room system 5100.

Figure 14:
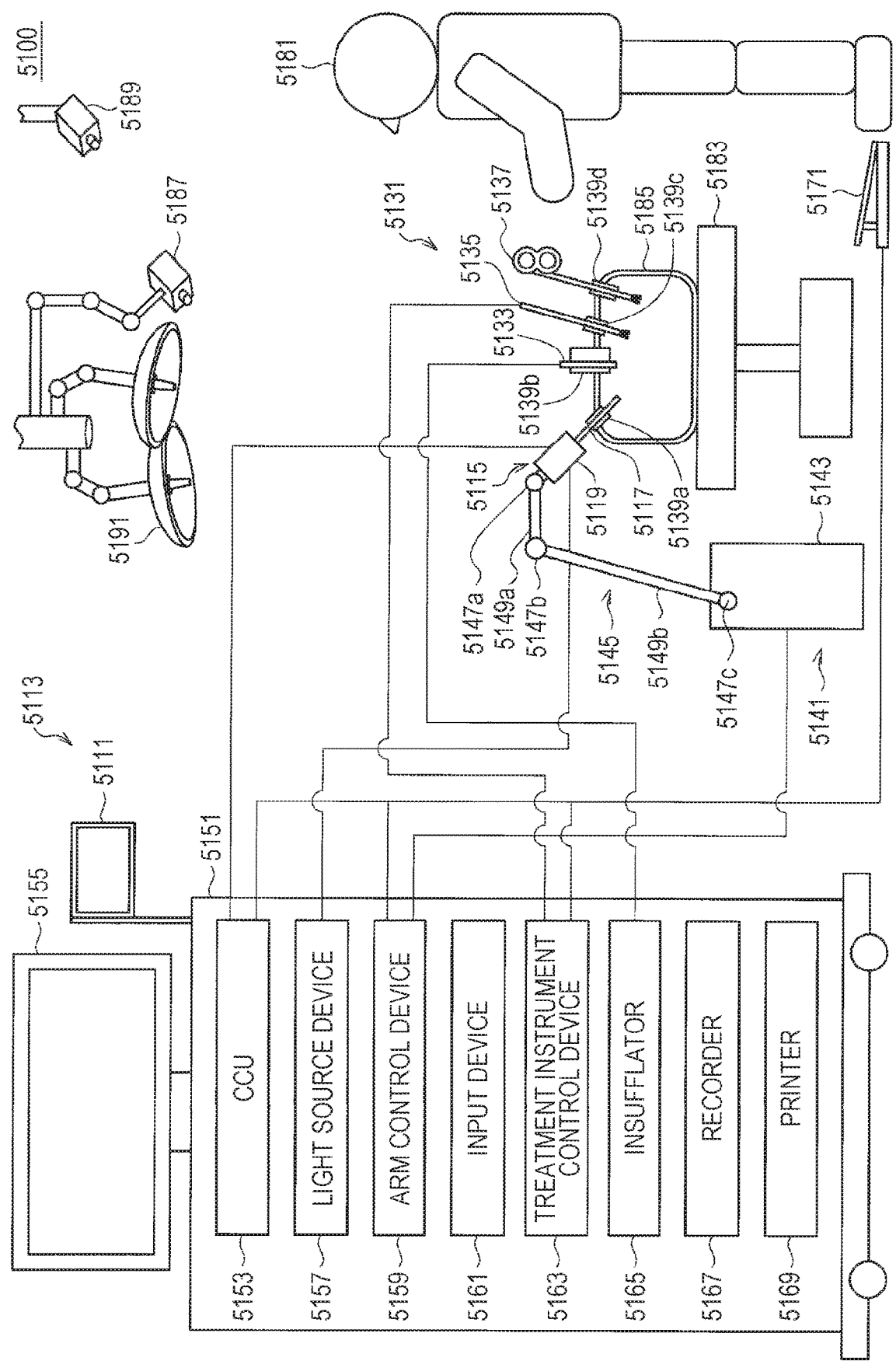
FIG. 14 is a diagram showing an example of a state of surgery applied with the operating room system.

FIG. 14 is a diagram showing an example of a state of surgery applied with the operating room system as described above. The ceiling camera 5187 and the operation-place camera 5189 are provided on the ceiling of the operating room, and can photograph a hand of an operator (surgeon) 5181 who performs treatment on an affected part of a patient 5185 on the patient bed 5183 and a state of the entire operating room. The ceiling camera 5187 and the operation-place camera 5189 may be provided with a magnification adjustment function, a focal length adjustment function, a photographing direction adjustment function, and the like. The illumination lamp 5191 is provided on the ceiling of the operating room and illuminates at least the hand of the operator 5181. The illumination lamp 5191 may be capable of appropriately adjusting an irradiation light amount thereof, a wavelength (color) of the irradiation light, an irradiation direction of the light, and the like.

The endoscopic surgery system 5113, the patient bed 5183, the ceiling camera 5187, the operation-place camera 5189, and the illumination lamp 5191 are connected, as shown in FIG. 12, so as to be able to cooperate with each other via the audiovisual controller 5107 and the operating room control device 5109 (not shown in FIG. 14). The centralized operation panel 5111 is provided in the operating room, and as described above, the user can appropriately operate these devices present in the operating room via the centralized operation panel 5111.

Hereinafter, a configuration of the endoscopic surgery system 5113 will be described in detail. As illustrated, the endoscopic surgery system 5113 includes: an endoscope 5115; other surgical instrument 5131; a support arm device 5141 supporting the endoscope 5115; and a cart 5151 mounted with various devices for endoscopic surgery.

In endoscopic surgery, instead of cutting and opening the abdominal wall, a plurality of cylindrical opening tools called trocars 5139a to 5139d is punctured in the abdominal wall. Then, from the trocars 5139a to 5139d, a lens barrel 5117 of the endoscope 5115 and other surgical instrument 5131 are inserted into the body cavity of the patient 5185. In the illustrated example, as other surgical instrument 5131, an insufflation tube 5133, an energy treatment instrument 5135, and forceps 5137 are inserted into the body cavity of the patient 5185. Furthermore, the energy treatment instrument 5135 is a treatment instrument that performs incision and peeling of a tissue, sealing of a blood vessel, or the like by a high-frequency current or ultrasonic vibrations. However, the illustrated surgical instrument 5131 is merely an example, and various surgical instruments generally used in endoscopic surgery, for example, tweezers, retractor, and the like may be used as the surgical instrument 5131.

An image of the operative site in the body cavity of the patient 5185 photographed by the endoscope 5115 is displayed on a display device 5155. While viewing the image of the operative site displayed on the display device 5155 in real time, the operator 5181 uses the energy treatment instrument 5135 or the forceps 5137 to perform treatment such as removing the affected area, or the like. Note that, although illustration is omitted, the insufflation tube 5133, the energy treatment instrument 5135, and the forceps 5137 are held by the operator 5181, an assistant, or the like during the surgery.

(Support Arm Device)

The support arm device 5141 includes an arm unit 5145 extending from a base unit 5143. In the illustrated example, the arm unit 5145 includes joint units 5147a, 5147b, and 5147c, and links 5149a and 5149b, and is driven by control from an arm control device 5159. The arm unit 5145 supports the endoscope 5115, and controls a position and an orientation thereof. With this arrangement, stable position fixation of the endoscope 5115 can be realized.

(Endoscope)

The endoscope 5115 includes the lens barrel 5117 whose region of a predetermined length from a distal end is inserted into the body cavity of the patient 5185, and a camera head 5119 connected to a proximal end of the lens barrel 5117. In the illustrated example, the endoscope 5115 configured as a so-called rigid scope having a rigid lens barrel 5117 is illustrated, but the endoscope 5115 may be configured as a so-called flexible endoscope having a flexible lens barrel 5117.

At the distal end of the lens barrel 5117, an opening fitted with an objective lens is provided. The endoscope 5115 is connected with a light source device 5157, and light generated by the light source device 5157 is guided to the distal end of the lens barrel by a light guide extended inside the lens barrel 5117, and emitted toward an observation target in the body cavity of the patient 5185 through the objective lens. Note that the endoscope 5115 may be a forward-viewing endoscope, or may be an oblique-viewing endoscope or a side-viewing endoscope.

Inside the camera head 5119, an optical system and an imaging element are provided, and reflected light (observation light) from the observation target is condensed on the imaging element by the optical system. The observation light is photoelectrically converted by the imaging element, and an electric signal corresponding to the observation light, in other words, an image signal corresponding to an observation image is generated. The image signal is transmitted to a camera control unit (CCU) 5153 as RAW data. Note that the camera head 5119 is installed with a function of adjusting a magnification and a focal length by appropriately driving the optical system.

Note that, for example, in order to support stereoscopic vision (3D display) or the like, a plurality of imaging elements may be provided in the camera head 5119. In this case, inside the lens barrel 5117, a plurality of relay optical systems is provided in order to guide observation light to each of the plurality of imaging elements.

(Various Devices Installed in Cart)

The CCU 5153 is configured by a central processing unit (CPU), a graphics processing unit (GPU), and the like, and integrally controls action of the endoscope 5115 and the display device 5155. Specifically, the CCU 5153 applies, on the image signal received from the camera head 5119, various types of image processing for displaying an image based on the image signal, for example, development processing (demosaicing processing). The CCU 5153 supplies the image signal subjected to the image processing to the display device 5155. Furthermore, the CCU 5153 is connected with the audiovisual controller 5107 shown in FIG. 12. The CCU 5153 also supplies the image signal subjected to the image processing to the audiovisual controller 5107. Furthermore, the CCU 5153 transmits a control signal to the camera head 5119 to control the driving thereof. The control signal may include information regarding imaging conditions such as a magnification and a focal length. The information regarding the imaging conditions may be inputted through an input device 5161, or may be inputted through the above-described centralized operation panel 5111.

The display device 5155 displays an image based on the image signal subjected to the image processing by the CCU 5153, under the control of the CCU 5153. In a case where the endoscope 5115 supports high-resolution imaging such as 4K (number of horizontal pixels 3840×number of vertical pixels 2160), 8K (number of horizontal pixels 7680×number of vertical pixels 4320), or the like and/or supports a 3D display, one capable of high resolution display and/or one capable of 3D display corresponding respectively, may be used as the display device 5155. In a case where the endoscope 5115 supports high resolution photographing such as 4K or 8K, a sense of immersion can be further obtained by using a display device 5155 having a size of 55 inches or more. Furthermore, a plurality of the display devices 5155 having different resolutions and sizes may be provided depending on the application.

The light source device 5157 is configured by a light source such as a light emitting diode (LED), for example, and supplies illumination light at a time of photographing the operative site to the endoscope 5115.

The arm control device 5159 is configured by a processor such as a CPU, for example, and controls driving of the arm unit 5145 of the support arm device 5141 in accordance with a predetermined control method, by acting in accordance with a predetermined program.

The input device 5161 is an input interface to the endoscopic surgery system 5113. The user can input various types of information and input instructions to the endoscopic surgery system 5113 via the input device 5161. For example, the user inputs, via the input device 5161, various types of information regarding the surgery such as physical information of the patient and information regarding an operative procedure. Furthermore, for example, via the input device 5161, the user inputs an instruction for driving the arm unit 5145, an instruction for changing imaging conditions (a type of irradiation light, a magnification, a focal length, and the like) by the endoscope 5115, an instruction for driving the energy treatment instrument 5135, and the like.

A type of the input device 5161 is not limited, and the input device 5161 may be various known input devices. For example, a mouse, a keyboard, a touch panel, a switch, a foot switch 5171, and/or a lever, and the like may be applied as the input device 5161. In a case where a touch panel is used as the input device 5161, the touch panel may be provided on a display surface of the display device 5155.

Alternatively, the input device 5161 is a device worn by the user, for example, a glasses type wearable device or a head mounted display (HMD), and various inputs are performed in accordance with a user's gesture or line-of-sight detected by these devices. Furthermore, the input device 5161 includes a camera capable of detecting user's movement, and various inputs are performed in accordance with a user's gesture and line-of-sight detected from an image captured by the camera. Moreover, the input device 5161 includes a microphone capable of collecting user's voice, and various inputs are performed by voice via the microphone. As described above, by configuring the input device 5161 to be able to input various types of information in a non-contact manner, a user (for example, the operator 5181) particularly belonging to a clean area can operate a device belonging to an unclean area without contacting. Furthermore, since the user can operate the device without releasing his/her hand from the surgical instrument being held, the convenience of the user is improved.

A treatment instrument control device 5163 controls driving of the energy treatment instrument 5135 for ablation of a tissue, incision, sealing of a blood vessel, or the like. An insufflator 5165 sends gas into the body cavity through the insufflation tube 5133 in order to inflate the body cavity of the patient 5185 for the purpose of securing a visual field by the endoscope 5115 and securing a working space of the operator. A recorder 5167 is a device capable of recording various types of information regarding the surgery. A printer 5169 is a device capable of printing various types of information regarding the surgery in various forms such as text, images, and graphs.

Hereinafter, a particularly characteristic configuration of the endoscopic surgery system 5113 will be described in more detail.

(Support Arm Device)

The support arm device 5141 includes the base unit 5143 that is a base, and the arm unit 5145 extending from the base unit 5143. In the illustrated example, the arm unit 5145 includes a plurality of the joint units 5147*a*, 5147*b*, and 5147*c*, and a plurality of the links 5149*a* and 5149*b* connected by the joint unit 5147*b*, but the configuration of the arm unit 5145 is illustrated in a simplified manner in FIG. 14, for the sake of simplicity. In practice, a shape, the number, and an arrangement of the joint units 5147*a* to 5147*c* and the links 5149*a* and 5149*b*, a direction of a rotation axis of the joint units 5147*a* to 5147*c*, and the like may be set as appropriate such that the arm unit 5145 has a desired degree of freedom. For example, the arm unit 5145 may be preferably configured to have a degree of freedom of six or more degrees of freedom. With this configuration, since the endoscope 5115 can be freely moved within a movable range of the arm unit 5145, it is possible to insert the lens barrel 5117 of the endoscope 5115 into the body cavity of the patient 5185 from a desired direction.

The joint units 5147*a* to 5147*c* are provided with an actuator, and the joint units 5147*a* to 5147*c* are configured to be rotatable around a predetermined rotation axis by driving of the actuator. By controlling the driving of the actuator with the arm control device 5159, rotation angles of the individual joint units 5147*a* to 5147*c* are controlled, and driving of the arm unit 5145 is controlled. With this configuration, control of a position and an orientation of the endoscope 5115 can be realized. At this time, the arm control device 5159 can control the driving of the arm unit 5145 by various known control methods such as force control or position control.

For example, by the operator 5181 appropriately performing operation input via the input device 5161 (including the foot switch 5171), the driving of the arm unit 5145 may be appropriately controlled by the arm control device 5159 in accordance with the operation input, and a position and an orientation of the endoscope 5115 may be controlled. With this control, the endoscope 5115 at the distal end of the arm unit 5145 can be moved from any position to any position, and then fixedly supported at a position after the movement. Note that the arm unit 5145 may be operated by a so-called master slave method. In this case, the arm unit 5145 can be remotely operated by the user via the input device 5161 installed at a location distant from the operating room.

Furthermore, in a case where force control is applied, the arm control device 5159 may perform a so-called power assist control for driving the actuator of the individual joint unit 5147a to 5147c such that the arm unit 5145 receives an external force from the user and moves smoothly in accordance with the external force. Thus, when the user moves the arm unit 5145 while directly touching the arm unit 5145, the arm unit 5145 can be moved with a relatively light force. Therefore, it becomes possible to move the endoscope 5115 more intuitively and with a simpler operation, and the convenience of the user can be improved.

Here, in general, in endoscopic surgery, the endoscope 5115 is held by a doctor called scopist. On the other hand, since it becomes possible to fix the position of the endoscope 5115 more reliably without human hands by using the support arm device 5141, an image of the operative site can be stably obtained, and the surgery can be smoothly performed.

Note that the arm control device 5159 may not necessarily be provided in the cart 5151. Furthermore, the arm control device 5159 may not necessarily be one device. For example, the arm control device 5159 may be individually provided at each of the joint units 5147a to 5147c of the arm unit 5145 of the support arm device 5141, and a plurality of the arm control devices 5159 may cooperate with one another to realize drive control of the arm unit 5145.

(Light Source Device)

The light source device 5157 supplies the endoscope 5115 with illumination light for photographing the operative site. The light source device 5157 includes, for example, a white light source configured by an LED, a laser light source, or a combination thereof. At this time, in a case where the white light source is configured by a combination of RGB laser light sources, since output intensity and output timing of each color (each wavelength) can be controlled with high precision, the light source device 5157 can adjust white balance of a captured image. Furthermore, in this case, it is also possible to capture an image corresponding to each of RGB in a time division manner by irradiating the observation target with laser light from each of the RGB laser light sources in a time-division manner, and controlling driving of the imaging element of the camera head 5119 in synchronization with the irradiation timing. According to this method, it is possible to obtain a color image without providing a color filter in the imaging element.

Furthermore, driving of the light source device 5157 may be controlled to change intensity of the light to be outputted at predetermined time intervals. By acquiring images in a time-division manner by controlling the driving of the imaging element of the camera head 5119 in synchronization with the timing of the change of the light intensity, and combining the images, it is possible to generate an image of a high dynamic range without a so-called black defects and whiteout.

Furthermore, the light source device 5157 may be configured to be able to supply light having a predetermined wavelength band corresponding to special light observation. In the special light observation, for example, so-called narrow band imaging is performed in which predetermined tissues such as blood vessels in a mucous membrane surface layer are imaged with high contrast by utilizing wavelength dependency of light absorption in body tissue and irradiating the predetermined tissues with light having a narrower band than that of the irradiation light (in other words, white light) at the time of normal observation. Alternatively, in the special light observation, fluorescence observation for obtaining an image by fluorescence generated by irradiation of excitation light may be performed. In the fluorescence observation, it is possible to perform one that irradiates a body tissue with excitation light and observes fluorescence from the body tissue (autofluorescence observation), one that locally injects a reagent such as indocyanine green (ICG) into a body tissue and irradiates the body tissue with excitation light corresponding to the fluorescence wavelength of the reagent to obtain a fluorescent image, or the like. The light source device 5157 may be configured to be able to supply narrow band light and/or excitation light corresponding to such special light observation.

(Camera Head and CCU)

Figure 15:
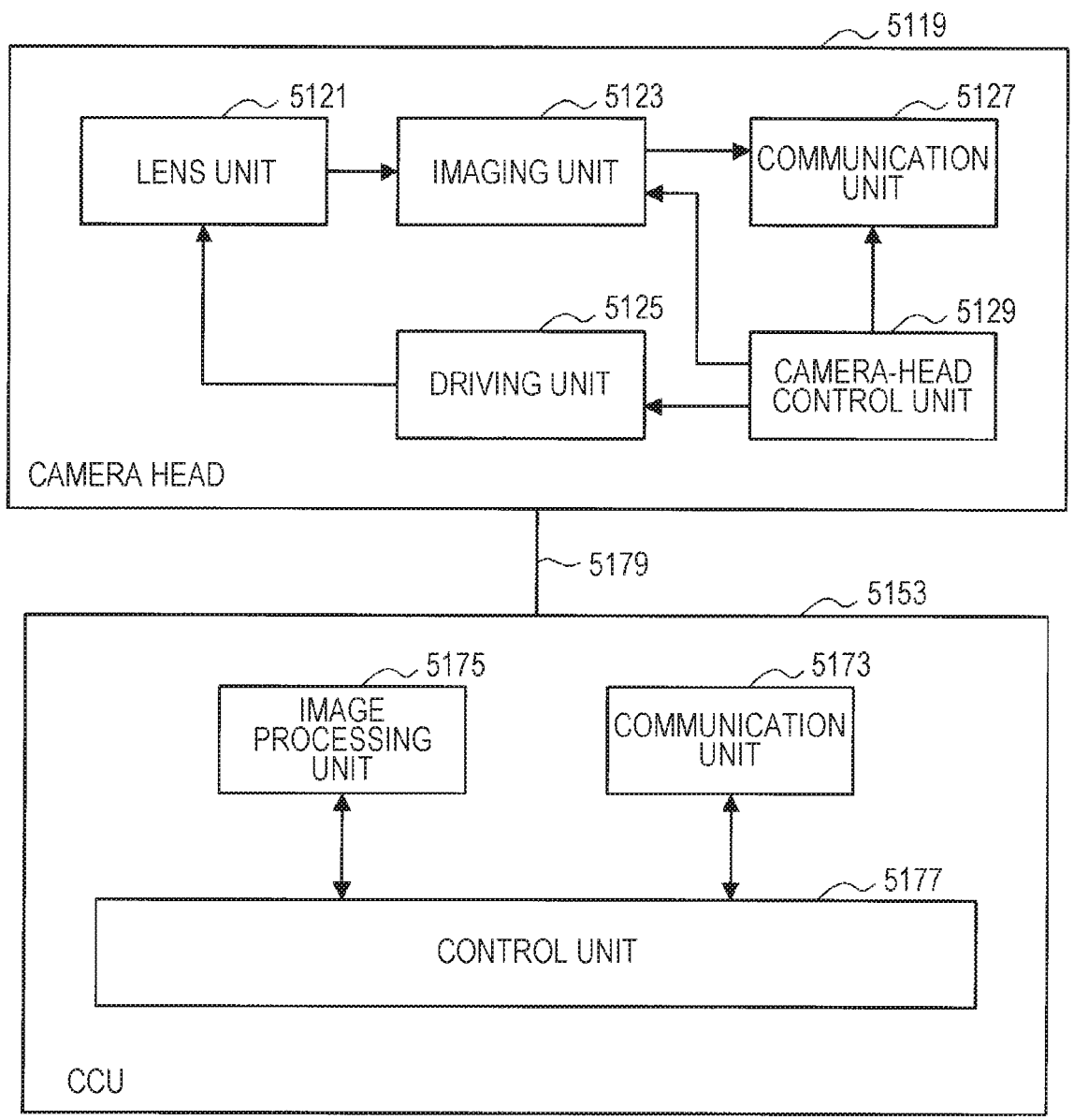
FIG. 15 is a block diagram showing an example of a functional configuration of a camera head and a CCU shown in FIG. 14.

Functions of the camera head 5119 and the CCU 5153 of the endoscope 5115 will be described in more detail with reference to FIG. 15. FIG. 15 is a block diagram showing an example of a functional configuration of the camera head 5119 and the CCU 5153 shown in FIG. 14.

Referring to FIG. 15, the camera head 5119 has a lens unit 5121, an imaging unit 5123, a driving unit 5125, a communication unit 5127, and a camera-head control unit 5129 as functions thereof. Furthermore, the CCU 5153 has a communication unit 5173, an image processing unit 5175, and a control unit 5177 as functions thereof. The camera head 5119 and the CCU 5153 are communicably connected in both directions by a transmission cable 5179.

First, a functional configuration of the camera head 5119 will be described. The lens unit 5121 is an optical system provided at a connection part with the lens barrel 5117. Observation light taken in from the distal end of the lens barrel 5117 is guided to the camera head 5119 and is incident on the lens unit 5121. The lens unit 5121 is configured by combining a plurality of lenses including a zoom lens and a focus lens. The optical characteristic of the lens unit 5121 is adjusted so as to condense the observation light on a light receiving surface of an imaging element of the imaging unit 5123. Furthermore, the zoom lens and the focus lens are configured such that positions thereof on the optical axis can be moved for adjustment of a magnification and focus of a captured image.

The imaging unit 5123 is configured by the imaging element, and is disposed downstream of the lens unit 5121. Observation light having passed through the lens unit 5121 is condensed on the light receiving surface of the imaging element, and an image signal corresponding to an observation image is generated by photoelectric conversion. The image signal generated by the imaging unit 5123 is provided to the communication unit 5127.

As an imaging element that configures the imaging unit 5123, for example, a complementary metal oxide semiconductor (CMOS) type image sensor having a Bayer arrangement and being capable of a color photographing is used. Note that, as the imaging element, for example, one applicable to photographing of a high resolution image of 4K or more may be used. Since an image of the operative site can be obtained with high resolution, the operator 5181 can grasp a state of the operative site in more detail, and can proceed the surgery more smoothly.

Furthermore, the imaging element that configures the imaging unit 5123 has a configuration having a pair of imaging elements for individually acquiring image signals for the right eye and for the left eye corresponding to 3D display. Performing 3D display enables the operator 5181 to more accurately grasp a depth of living tissues in the operative site. Note that, in a case where the imaging unit 5123 is configured as a multi-plate type, a plurality of systems of the lens unit 5121 is also provided corresponding to individual imaging elements.

Furthermore, the imaging unit 5123 may not necessarily be provided in the camera head 5119. For example, the imaging unit 5123 may be provided inside the lens barrel 5117 immediately after the objective lens.

The driving unit 5125 is configured by an actuator, and moves the zoom lens and the focus lens of the lens unit 5121 along the optical axis by a predetermined distance under control from the camera-head control unit 5129. With this configuration, a magnification and focus of a captured image by the imaging unit 5123 may be appropriately adjusted.

The communication unit 5127 is configured by a communication device for exchange of various types of information with the CCU 5153. The communication unit 5127 transmits an image signal obtained from the imaging unit 5123 to the CCU 5153 via the transmission cable 5179 as RAW data. In this case, in order to display a captured image of the operative site with low latency, it is preferable that the image signal is transmitted by optical communication. This is because, since the operator 5181 performs the surgery while observing the condition of the affected area through the captured image during the surgery, it is required that a moving image of the operative site is displayed in real time as much as possible for a safer and more reliable surgery. In a case where optical communication is performed, the communication unit 5127 is provided with a photoelectric conversion module that converts an electrical signal into an optical signal. An image signal is converted into an optical signal by the photoelectric conversion module, and then transmitted to the CCU 5153 via the transmission cable 5179.

Furthermore, the communication unit 5127 receives, from the CCU 5153, a control signal for controlling driving of the camera head 5119. The control signal includes information regarding imaging conditions such as information of specifying a frame rate of a captured image, information of specifying an exposure value at the time of imaging, information of specifying a magnification and focus of a captured image, and/or the like. The communication unit 5127 provides the received control signal to the camera-head control unit 5129. Note that the control signal from the CCU 5153 may also be transmitted by optical communication. In this case, the communication unit 5127 is provided with a photoelectric conversion module that converts an optical signal into an electrical signal, and a control signal is converted into an electrical signal by the photoelectric conversion module, and then provided to the camera-head control unit 5129.

Note that imaging conditions such as a frame rate, an exposure value, a magnification, and focus described above are automatically set by the control unit 5177 of the CCU 5153 on the basis of the acquired image signal. That is, a so-called auto exposure (AE) function, auto focus (AF) function, and auto white balance (AWB) function are installed in the endoscope 5115.

The camera-head control unit 5129 controls driving of the camera head 5119 on the basis of the control signal from the CCU 5153 received via the communication unit 5127. For example, on the basis of information of specifying a frame rate of a captured image and/or information of specifying exposure at the time of imaging, the camera-head control unit 5129 controls driving of the imaging element of the imaging unit 5123. Furthermore, for example, on the basis of information of specifying a magnification and focus of a captured image, the camera-head control unit 5129 appropriately moves the zoom lens and the focus lens of the lens unit 5121 via the driving unit 5125. The camera-head control unit 5129 may further include a function of storing information for identifying the lens barrel 5117 and the camera head 5119.

Note that, by arranging the configuration of the lens unit 5121, the imaging unit 5123, and the like in a sealed structure with high airtightness and waterproofness, the camera head 5119 can be made resistant to autoclave sterilization.

Next, a functional configuration of the CCU 5153 will be described. The communication unit 5173 is configured by a communication device for exchange of various types of information with the camera head 5119. The communication unit 5173 receives an image signal transmitted via the transmission cable 5179 from the camera head 5119. In this case, as described above, the image signal can be suitably transmitted by optical communication. In this case, corresponding to the optical communication, the communication unit 5173 is provided with a photoelectric conversion module that converts an optical signal into an electrical signal. The communication unit 5173 provides the image processing unit 5175 with an image signal converted into the electrical signal.

Furthermore, the communication unit 5173 transmits, to the camera head 5119, a control signal for controlling driving of the camera head 5119. The control signal may also be transmitted by optical communication.

The image processing unit 5175 performs various types of image processing on an image signal that is RAW data transmitted from the camera head 5119. The image processing includes various types of known signal processing such as development processing, high image quality processing (such as band emphasizing processing, super resolution processing, noise reduction (NR) processing, and/or camera shake correction processing), enlargement processing (electronic zoom processing), and/or the like. Furthermore, the image processing unit 5175 performs wave-detection processing on an image signal for performing AE, AF, and AWB.

The image processing unit 5175 is configured by a processor such as a CPU or a GPU, and the above-described image processing and wave-detection processing can be performed by the processor acting in accordance with a predetermined program. Note that, in a case where the image processing unit 5175 is configured by a plurality of GPUs, the image processing unit 5175 appropriately divides information regarding an image signal, and performs image processing in parallel by this plurality of GPUs.

The control unit 5177 performs various types of control related to imaging of the operative site by the endoscope 5115 and display of a captured image. For example, the control unit 5177 generates a control signal for controlling the driving of the camera head 5119. At this time, in a case where an imaging condition has been inputted by the user, the control unit 5177 generates a control signal on the basis of the input by the user. Alternatively, in a case where the endoscope 5115 is provided with the AE function, the AF function, and the AWB function, in response to a result of the wave-detection processing by the image processing unit 5175, the control unit 5177 appropriately calculates an optimal exposure value, a focal length, and white balance, and generates a control signal.

Furthermore, the control unit 5177 causes the display device 5155 to display an image of the operative site on the basis of the image signal subjected to the image processing by the image processing unit 5175. At this time, the control unit 5177 recognizes various objects in an operative site image by using various image recognition techniques. For example, by detecting a shape, a color, and the like of an edge of the object included in the operative site image, the control unit 5177 can recognize a surgical instrument such as forceps, a specific living site, bleeding, mist in using the energy treatment instrument 5135, and the like. When causing the display device 5155 to display the image of the operative site, the control unit 5177 uses the recognition result to superimpose and display various types of surgery support information on the image of the operative site. By superimposing and displaying the surgery support information and presenting to the operator 5181, it becomes possible to continue the surgery more safely and reliably.

The transmission cable 5179 connecting the camera head 5119 and the CCU 5153 is an electric signal cable corresponding to communication of an electric signal, an optical fiber corresponding to optical communication, or a composite cable of these.

Here, in the illustrated example, communication is performed by wire communication using the transmission cable 5179, but communication between the camera head 5119 and the CCU 5153 may be performed wirelessly. In a case where the communication between the two is performed wirelessly, since it becomes unnecessary to lay the transmission cable 5179 in the operating room, it is possible to eliminate a situation in which movement of medical staff in the operating room is hindered by the transmission cable 5179.

An example of the operating room system 5100 to which the technology according to the present disclosure can be applied has been described above. Note that, here, a description has been given to a case where a medical system to which the operating room system 5100 is applied is the endoscopic surgery system 5113 as an example, but the configuration of the operating room system 5100 is not limited to such an example. For example, the operating room system 5100 may be applied to a flexible endoscopic system for examination or a microsurgery system, instead of the endoscopic surgery system 5113.

Among the configurations described above, the technology according to the present disclosure can be applied to the camera head 5119, the ceiling camera 5187, and the operation-place camera 5189. In a case where the technology according to the present disclosure is applied to the camera head 5119, for example, the imaging lens 20 corresponds to the lens unit 5121, and the imaging unit 31, the preprocessing unit 32, and the image processing unit 33 correspond to the imaging unit 5123. Furthermore, the control unit 51 corresponds to the camera-head control unit 5129. As described above, if the present technology is applied, it is possible to focus on a desired subject at high speed and with high quality when imaging a desired subject with the camera head 5119.

Furthermore, the series of processes described in the specification can be executed by hardware, software, or a combined configuration thereof. In a case of executing processing by software, a program recorded with a processing sequence is installed and executed in a memory incorporated in dedicated hardware in a computer. Alternatively, the program can be installed and executed on a general-purpose computer that can execute various processes.

For example, the program can be recorded in advance on a hard disk, a solid state drive (SSD), or a read only memory (ROM) as a recording medium. Alternatively, the program can be stored (recorded) temporarily or permanently, in a removable recording medium such as a flexible disk, a compact disc read only memory (CD-ROM), a magneto optical (MO) disc, a digital versatile disc (DVD), a Blu-Ray (registered trademark) disc (BD), a magnetic disc, or a semiconductor memory card. Such a removable recording medium can be provided as so-called package software.

Furthermore, in addition to being installed on a computer from a removable recording medium, the program may be transferred to the computer in a wired or wireless manner from a download site via a network such as a local area network (LAN) or the Internet. In the computer, the program transferred in such a manner can be received and installed on a recording medium such as an incorporated hard disk.

Note that the effects described in this specification are merely examples and are not limited, and additional effects that are not described may be present. Furthermore, the present technology should not be construed as being limited to the embodiments of the technology described above. The embodiments of the present technology disclose the present technology in the form of exemplification, and it is obvious that those skilled in the art can modify or substitute the embodiments within the gist of the present technology. In other words, in order to determine the gist of the present technology, claims should be taken into consideration.

Furthermore, the imaging apparatus of the present technology may also have the following configurations.

(1) An imaging apparatus including:

an imaging element including an image output pixel and a phase difference detection pixel; and a control unit that generates focus state change information indicating whether or not a change in a focus state is a monotonous change, on the basis of focus state information obtained during execution of focus control based on image-plane phase difference information obtained using the phase difference detection pixel over a predetermined period, and continues image-plane phase difference focus control based on the image-plane phase difference information in a case where the focus state change information indicates that a change in the focus state is a monotonous change.

(2) The imaging apparatus according to (1), in which the control unit switches from the image-plane phase difference focus control to another focus control based on information other than the image-plane phase difference information in a case where the focus state change information indicates that a change in the focus state is not a monotonous change.

(3) The imaging apparatus according to (2), in which the another focus control is contrast focus control based on image information obtained using the image output pixel or distance measurement information focus control based on distance measurement information obtained by a distancemeasurement-information generating element provided separately from the imaging element.

(4) The imaging apparatus according to (2), in which the another focus control is contrast focus control based on image information obtained using the image output pixel, and the control unit executes the image-plane phase difference focus control after an end of the contrast focus control.

(5) The imaging apparatus according to any one of (1) to (4), in which the control unit determines reliability of a correlation calculation result of two images having parallax obtained from an output of the phase difference detection pixel prior to the predetermined period, and generates the focus state change information in a case where it is determined that the correlation calculation result is reliable.

(6) The imaging apparatus according to (5), in which the control unit performs an entire search operation in a case where it is determined that the correlation calculation result is not reliable.

(7) The imaging apparatus according to any one of (1) to (6), in which the focus state information is an actual lens position of a focus lens or a defocus amount indicated by the image-plane phase difference information, and the control unit determines whether or not a change in the focus state is a monotonous change, on the basis of a change amount in the actual lens position or a change amount in the defocus amount.

(8) The imaging apparatus according to any one of (1) to (6), in which the focus state information is an actual lens position of a focus lens or a defocus amount indicated by the image-plane phase difference information, and the control unit determines whether or not a change in the focus state is a monotonous change, on the basis of a frequency characteristic of a change amount in the actual lens position or a frequency characteristic of a change amount in the defocus amount.

(9) The imaging apparatus according to any one of (1) to (6), in which the focus state information is an actual lens position of a focus lens or a defocus amount indicated by the image-plane phase difference information, and the control unit determines whether or not a change in the focus state is a monotonous change on the basis of the actual lens position or the defocus amount.

(10) The imaging apparatus according to any one of (7) to (9), in which the focus state information is an actual lens position of a focus lens in an interchangeable lens, acquired through communication with the interchangeable lens.

Furthermore, the imaging apparatus of the present technology may also have the following configurations.

(1) An imaging apparatus including:

an imaging element including an image output pixel and an image-plane phase difference detection pixel; and a determination unit that generates focus state change information indicating whether or not a change in a focus state is a monotonous change on the basis of focus state information obtained during execution of image-plane phase difference focus control based on image-plane phase difference information obtained using the phase difference detection pixel over a predetermined period, determines as a state where a focus position shift of a focus lens is large in a case where the focus state change information indicates that a change in the focus state is a monotonous change, and determines as a state where contrast of a subject imaged by the image output pixel is low in a case where the focus state change information indicates that a change in the focus state is not a monotonous change.

(2) The imaging apparatus according to (1), in which the focus state information is an actual lens position of a focus lens or a defocus amount indicated by the image-plane phase difference information, and the determination unit determines whether or not a change in the focus state is a monotonous change on the basis of a change amount in the actual lens position or a change amount in the defocus amount.

(3) The imaging apparatus according to (1), in which the focus state information is an actual lens position of a focus lens or a defocus amount indicated by the image-plane phase difference information, and the determination unit determines whether or not a change in the focus state is a monotonous change, on the basis of a frequency characteristic of a change amount in an actual lens position of the focus lens or a frequency characteristic of a change amount in the defocus amount.

(4) The imaging apparatus according to (1), in which the focus state information is an actual lens position of a focus lens.

(5) The imaging apparatus according to (1), in which the focus state information is a defocus amount indicated by the image-plane phase difference information.

(16) The imaging apparatus according to (1), in which the focus state information is an actual lens position of a focus lens and a defocus amount indicated by the image-plane phase difference information, and the determination unit determines whether or not a change in the focus state is a monotonous change on the basis of both an actual lens position of the focus lens and the defocus amount.

(17) The imaging apparatus according to any one of (1) to (6), in which the determination unit determines reliability of a correlation calculation result of two images having parallax obtained from an output of the image-plane phase difference detection pixel prior to the predetermined period, and, in a case where it is determined that the correlation calculation result is reliable, the control unit starts generation of the focus state change information.

(18) The imaging apparatus according to any one of (1) to (7), in which the determination unit controls presentation of a state determination result by an information presentation unit that presents a state determination result to a user.

Furthermore, the present technology may be the following program.

(1) A program for causing a computer to execute focus control in an imaging apparatus, the program causing the computer to execute:

a procedure of acquiring image-plane phase difference information obtained using a phase difference detection pixel of an imaging element including an image output pixel and the phase difference detection pixel;

a procedure of generating focus state change information indicating whether or not a change in a focus state is a monotonous change, on the basis of focus state information obtained during execution of image-plane phase difference focus control based on image-plane phase difference information obtained over a predetermined period; and a procedure of continuing image-plane phase difference focus control based on the image-plane phase difference information in a case where the focus state change information indicates that a change in the focus state is a monotonous change.

(2) A program for causing a computer to execute focus control in an imaging apparatus, the program causing the computer to execute:

acquiring image-plane phase difference information obtained using a phase difference detection pixel from an imaging element including an image output pixel and the phase difference detection pixel;

a procedure of generating focus state change information indicating whether or not a change in a focus state is a monotonous change, on the basis of focus state information obtained during execution of image-plane phase difference focus control based on image-plane phase difference information obtained over a predetermined period; and a procedure of determining as a state where a focus position shift of a focus lens is large in a case where the focus state change information indicates that a change in the focus state is a monotonous change, and determining as a state where contrast of a subject imaged by the image output pixel is low in a case where the focus state change information indicates that a change in the focus state is not a monotonous change.

INDUSTRIAL APPLICABILITY

According to the imaging apparatus, the focus control method, and the focus determination method of the present technology, an imaging element including an image output pixel and a phase difference detection pixel is used. In the control unit, the imaging element including the image output pixel and the phase difference detection pixel is used, the control unit generates focus state change information indicating whether or not a change in a focus state is a monotonous change, on the basis of focus state information obtained during execution of focus control based on image-plane phase difference information obtained using the phase difference detection pixel over a predetermined period, and continues image-plane phase difference focus control based on the image-plane phase difference information in a case where the focus state change information indicates that a change in the focus state is a monotonous change. Therefore, for example, a frequency of performing an auto-focus operation of a contrast method decreases, and a high-speed and high-quality auto-focus operation becomes possible. Therefore, it is suitable for digital cameras, video cameras, endoscope cameras, and the like.

REFERENCE SIGNS LIST 10, 10a Imaging apparatus
20 Imaging lens
21 Imaging optical system
22 Lens drive processing unit
30, 30a Main body
31 Imaging unit
32 Preprocessing unit
33 Image processing unit
35 Display unit
36 Recording unit
39 User interface (I/F) unit
45 Transmissive mirror unit
46 Dedicated phase difference detection unit
51 Control unit
511 Determination unit
512 Focus control unit

The invention claimed is:

1. An imaging apparatus, comprising:
an imaging element that comprises an image output pixel and a phase difference detection pixel; and
a control unit configured to:
acquire image-plane phase difference information using the phase difference detection pixel over a determined time period;
generate focus state change information that indicates whether a change in a focus state in the determined time period is a monotonous change, wherein
the change in the focus state less than a specific value is the monotonous change,
the generation of the focus state change information is based on focus state information, and
the focus state information is obtained during execution of focus control based on the image-plane phase difference information over the determined time period; and
continue image-plane phase difference focus control based on the image-plane phase difference information in a case where the focus state change information indicates that the change in the focus state in the determined time period is the monotonous change.

2. The imaging apparatus according to claim 1, wherein the control unit is further configured to
switch from the image-plane phase difference focus control to a specific focus control based on information other than the image-plane phase difference information in a case where the focus state change information indicates that the change in the focus state is not the monotonous change.

3. The imaging apparatus according to claim 2, wherein the specific focus control comprises one of contrast focus control based on image information obtained from the image output pixel or distance measurement information focus control based on distance measurement information obtained by a distance-measurement-information generating element that is provided separately from the imaging element.

4. The imaging apparatus according to claim 2, wherein the specific focus control comprises contrast focus control based on image information obtained from the image output pixel, and
the control unit is further configured to execute the image-plane phase difference focus control after an end of the contrast focus control.

5. The imaging apparatus according to claim 1, wherein the control unit is further configured to:
determine reliability of a correlation calculation result of two images having parallax obtained from an output of the phase difference detection pixel prior to the determined time period; and
generate the focus state change information in a case where the correlation calculation result is determined to be reliable.

6. The imaging apparatus according to claim 5, wherein the control unit is further configured to execute an entire search operation in a case where the correlation calculation result is determined to be not reliable.

7. The imaging apparatus according to claim 1, wherein the focus state information comprises one of an actual lens position of a focus lens or a defocus amount indicated by the image-plane phase difference information, and
the control unit is further configured to determine whether the change in the focus state is the monotonous change based on one of a change amount in the actual lens position or a change amount in the defocus amount.

8. The imaging apparatus according to claim 1, wherein
the focus state information comprises one of an actual lens position of a focus lens or a defocus amount indicated by the image-plane phase difference information, and
the control unit is further configured to determine whether the change in the focus state is the monotonous change, based on one of a frequency characteristic of a change amount in the actual lens position or a frequency characteristic of a change amount in the defocus amount.

9. The imaging apparatus according to claim 1, wherein
the focus state information comprises one of an actual lens position of a focus lens or a defocus amount indicated by the image-plane phase difference information, and
the control unit is further configured to determine whether the change in the focus state is the monotonous change based on one of the actual lens position or the defocus amount.

10. The imaging apparatus according to claim 1, wherein
the focus state information comprises an actual lens position of a focus lens in an interchangeable lens, and
the actual lens position is acquired through communication with the interchangeable lens.

11. An imaging apparatus, comprising:
an imaging element that comprises an image output pixel and a phase difference detection pixel; and
a determination unit configured to:
  acquire image-plane phase difference information using the phase difference detection pixel over a determined time period;
  generate focus state change information that indicates whether a change in a focus state in the determined time period is a monotonous change, wherein
    the change in the focus state less than a specific value is the monotonous change,
    the generation of the focus state change information is based on focus state information, and
    the focus state information is obtained during execution of image-plane phase difference focus control based on the image-plane phase difference information over the determined time period;
  determine a first state in which a focus position shift of a focus lens is large in a case where the focus state change information indicates that the change in the focus state in the determined time period is the monotonous change, wherein the image-plane phase difference focus control based on the image-plane phase difference information is continued in the first state; and
  determine a second state in which contrast of a subject imaged by the image output pixel is low in a case where the focus state change information indicates that the change in the focus state in the determined time period is not the monotonous change.

12. The imaging apparatus according to claim 11, wherein
the focus state information comprises one of an actual lens position of the focus lens or a defocus amount indicated by the image-plane phase difference information, and
the determination unit is further configured to determine whether the change in the focus state is the monotonous change based on one of a change amount in the actual lens position or a change amount in the defocus amount.

13. The imaging apparatus according to claim 11, wherein
the focus state information comprises one of an actual lens position of the focus lens or a defocus amount indicated by the image-plane phase difference information, and
the determination unit is further configured to determine whether the change in the focus state is the monotonous change based on one of a frequency characteristic of a change amount in the actual lens position of the focus lens or a frequency characteristic of a change amount in the defocus amount.

14. The imaging apparatus according to claim 11, wherein
the focus state information comprises an actual lens position of the focus lens.

15. The imaging apparatus according to claim 11, wherein
the focus state information comprises a defocus amount indicated by the image-plane phase difference information.

16. The imaging apparatus according to claim 11, wherein
the focus state information comprises an actual lens position of the focus lens and a defocus amount indicated by the image-plane phase difference information, and
the determination unit is further configured to determine whether the change in the focus state is the monotonous change based on the actual lens position of the focus lens and the defocus amount.

17. The imaging apparatus according to claim 11, wherein the determination unit is further configured to:
  determine reliability of a correlation calculation result of two images having parallax obtained from an output of the phase difference detection pixel prior to the determined time period; and
  in a case where the correlation calculation result is determined to be reliable, control the generation of the focus state change information.

18. The imaging apparatus according to claim 11, wherein
the determination unit is further configured to control presentation of a state determination result by an information presentation unit that is configured to present the state determination result to a user.

19. A focus control method, comprising:
acquiring image-plane phase difference information over a determined time period using a phase difference detection pixel of an imaging element that includes an image output pixel and the phase difference detection pixel;
generating focus state change information that indicates whether a change in a focus state in the determined time period is a monotonous change, wherein
  the change in the focus state less than a specific value is the monotonous change,
  the generation of the focus state change information is based on focus state information, and
  the focus state information is obtained during execution of image-plane phase difference focus control based on the image-plane phase difference information over the determined time period; and
continuing the image-plane phase difference focus control based on the image-plane phase difference information at a time where the focus state change information indicates that the change in the focus state in the determined time period is the monotonous change.

20. A focus determination method, comprising:
acquiring image-plane phase difference information over a determined time period using a phase difference detection pixel of an imaging element that includes an image output pixel and the phase difference detection pixel;

generating focus state change information that indicates whether a change in a focus state is a monotonous change, wherein
the change in the focus state less than a specific value is the monotonous change,
the generation of the focus state change information is based on focus state information, and
the focus state information is obtained during execution of image-plane phase difference focus control based on the image-plane phase difference information over the determined time period; and determining a first state where a focus position shift of a focus lens is large in a case where the focus state change information indicates that the change in the focus state in the determined time period is the monotonous change, wherein the image-plane phase difference focus control based on the image-plane phase difference information is continued in the first state; and determining a second state where contrast of a subject imaged by the image output pixel is low in a case where the focus state change information indicates that the change in the focus state in the determined time period is not the monotonous change.

* * * * *